US00RE47369E

(19) United States
(12) Reissued Patent
Shen et al.

(10) Patent Number: US RE47,369 E
(45) **Date of Reissued Patent: *Apr. 30, 2019**

(54) ROLLING CUTTER

(71) Applicant: Smith International, Inc., Houston, TX (US)

(72) Inventors: Yuelin Shen, Spring, TX (US); Youhe Zhang, Spring, TX (US); Zhou Yong, Spring, TX (US); Jiaqing Yu, Conroe, TX (US); Madapusi K. Keshavan, The Woodlands, TX (US)

(73) Assignee: Smith International, Inc., Houston, TX (US)

( * ) Notice: This patent is subject to a terminal disclaimer.

(21) Appl. No.: 15/599,194

(22) Filed: May 18, 2017

Related U.S. Patent Documents

Reissue of:
(64) Patent No.: 9,033,070
Issued: May 19, 2015
Appl. No.: 14/456,436
Filed: Aug. 11, 2014

U.S. Applications:
(63) Continuation of application No. 13/847,825, filed on Mar. 20, 2013, now Pat. No. 8,800,691, which is a (Continued)

(51) Int. Cl.
*E21B 10/52* (2006.01)
*E21B 10/567* (2006.01)

(Continued)

(52) U.S. Cl.
CPC ..... *E21B 10/5673* (2013.01); *E21B 10/52* (2013.01); *E21B 10/573* (2013.01); *Y10T 29/49947* (2015.01); *Y10T 29/49963* (2015.01)

(58) Field of Classification Search
CPC .... E21B 10/5673; E21B 10/573; E21B 10/52; Y10T 29/49963

(Continued)

(56) References Cited

U.S. PATENT DOCUMENTS 1,723,381 A 8/1929 Seifert ..... E21B 10/003 175/334
1,790,613 A 1/1931 Gildersleeve et al. ..... E21B 10/12 175/348

(Continued)

FOREIGN PATENT DOCUMENTS

GB 2009287 6/1979
GB 2115460 9/1983

(Continued)

OTHER PUBLICATIONS

Combined Search and Examination Report dated Aug. 20, 2007 issued in Application No. GB0709717.3 (9 pages).

(Continued)

*Primary Examiner* — William C Doerrler
(74) *Attorney, Agent, or Firm* — Osha Liang LLP

(57) ABSTRACT

A cutting element for a drill bit includes an outer support element and an inner rotatable cutting element, a portion of which is disposed in the outer support element, where the inner rotatable cutting element has a body with a non-planar cutting face.

54 Claims, 17 Drawing Sheets

Related U.S. Application Data continuation of application No. 13/312,159, filed on Dec. 6, 2011, now Pat. No. 8,413,746, which is a continuation of application No. 12/751,663, filed on Mar. 31, 2010, now Pat. No. 8,091,655, which is a continuation of application No. 11/526,558, filed on Sep. 25, 2006, now Pat. No. 7,703,559.

(60) Provisional application No. 60/809,259, filed on May 30, 2006.

(51) Int. Cl.
*E21B 10/573* (2006.01)
*E21B 10/62* (2006.01)

(58) Field of Classification Search
USPC ..... 175/430, 432, 434, 426
See application file for complete search history.

(56) References Cited

U.S. PATENT DOCUMENTS

| | | | | |
|---|---|---|---|---|
| 4,104,344 | A | 8/1978 | Pope et al. | B01J 3/062 257/E23.111 |
| 4,200,159 | A | 4/1980 | Peschel et al. | B22F 7/06 175/428 |
| 4,222,446 | A | 9/1980 | Vasek | E21C 35/183 175/413 |
| 4,288,248 | A | 9/1981 | Bovenkerk et al. | B01J 3/062 419/11 |
| 4,350,215 | A | 9/1982 | Radtke | B23K 1/008 175/433 |
| 4,511,006 | A | 4/1985 | Grainger | B21K 25/00 175/354 |
| 4,553,615 | A | 11/1985 | Grainger | E21B 10/12 175/354 |
| 4,654,947 | A | 4/1987 | Davis | B23C 5/22 175/383 |
| 4,751,972 | A | 6/1988 | Jones et al. | E21B 10/50 175/336 |
| 4,756,631 | A | 7/1988 | Jones | E21B 10/22 175/359 |
| 4,756,632 | A | 7/1988 | Belanger | F16C 33/20 384/263 |
| 5,040,623 | A | 8/1991 | Vezirian | E21B 10/20 175/354 |
| 5,127,923 | A | 7/1992 | Bunting et al. | B24D 3/007 51/293 |
| 5,494,477 | A | 2/1996 | Flood et al. | B23B 27/146 175/428 |
| 5,662,720 | A | 9/1997 | O'Tighearnaigh | B22F 7/06 51/295 |
| 6,065,554 | A | 5/2000 | Taylor et al. | E21B 10/5673 175/430 |
| 7,533,739 | B2 | 5/2009 | Cooley et al. | E21B 10/573 175/412 |
| 7,703,559 | B2 | 4/2010 | Shen et al. | E21B 10/5673 175/426 |
| 8,091,655 | B2 | 1/2012 | Shen et al. | E21B 10/5673 175/426 |
| 8,413,746 | B2 | 4/2013 | Shen et al. | E21B 10/5673 175/426 |
| 2002/0144843 | A1* | 10/2002 | Mensa-Wilmot et al. | E21B 10/567 175/331 |
| 2002/0175555 | A1 | 11/2002 | Mercier | E21C 35/197 299/107 |
| 2006/0060391 | A1* | 3/2006 | Eyre | C22C 26/00 175/434 |
| 2007/0079991 | A1 | 4/2007 | Cooley et al. | B23B 27/12 175/57 |
| 2007/0278017 | A1 | 12/2007 | Shen et al. | E21B 10/5673 175/426 |
| 2008/0017419 | A1 | 1/2008 | Cooley et al. | B23B 27/12 175/286 |
| 2010/0219001 | A1 | 9/2010 | Shen et al. | E21B 10/5673 175/432 |
| 2012/0073881 | A1 | 3/2012 | Shen et al. | E21B 10/5673 175/428 |

FOREIGN PATENT DOCUMENTS

| | | |
|---|---|---|
| GB | 2306986 | 5/1997 |
| GB | 2418215 A * | 3/2006 |

OTHER PUBLICATIONS

Combined Search and Examination Report dated Jun. 20, 2008 issued in Application No. GB0809942.6 (6 pages).
UK Examination Report dated Feb. 25, 2009 issued in Application No. GB0709717.3 (2 pages).
UK Examination Report dated Feb. 25, 2009 issued in Application No. GB0809942.6 (2 pages).
Canadian Official Action dated Mar. 11, 2009 issued in Patent Application No. 2,590,282 (3 pages).
Examination Report for related United Kingdom Application No. GB0911456.2 dated Oct. 29, 2009. (3 pages).
Examination Report for United Kingdom Application No. 0809942.6, mailed on Nov. 6, 2009 (2 pages).
Examination Report for United Kingdom Application No. 0709717.3, mailed on Nov. 6, 2009 (2 pages).
Office Action issued in corresponding Canadian Application No. 2744144 dated Oct. 3, 2012 (3 pages).
Office Action issued in corresponding Canadian Application No. 2,744,144; Dated Aug. 22, 2013 (3 pages).

* cited by examiner

ROLLING CUTTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation of U.S. patent application Ser. No. 13/847,825, filed on Mar. 20, 2013, which is a continuation of U.S. patent application Ser. No. 13/312,159, filed on Dec. 6, 2011, which issued as U.S. Pat. No. 8,413,746, which is a continuation of U.S. patent application Ser. No. 12/751,663, filed on Mar. 31, 2010, which issued as U.S. Pat. No. 8,091,655, which is a continuation of U.S. patent application Ser. No. 11/526 558 filed on Sep. 25 2006 which issued as U.S. Pat. No. 7,703,559 which claims benefit under 35 U.S.C. §119(e) and is related to U.S. Patent Application Ser. No. 60/809,259 filed May 30, 2006, each of which are herein incorporated by reference in their entirety.

BACKGROUND OF INVENTION

1. Field of the Invention

Embodiments disclosed herein relate generally to cutting elements for drilling earth formations. More specifically, embodiments disclosed herein relate generally to rotatable cutting elements for rotary drill bits.

2. Background Art

Drill bits used to drill wellbores through earth formations generally are made within one of two broad categories of bit structures. Drill bits in the first category are generally known as "roller cone" bits, which include a bit body having one or more roller cones rotatably mounted to the bit body. The bit body is typically formed from steel or another high strength material. The roller cones are also typically formed from steel or other high strength material and include a plurality of cutting elements disposed at selected positions about the cones. The cutting elements may be formed from the same base material as is the cone. These bits are typically referred to as "milled tooth" bits. Other roller cone bits include "insert" cutting elements that are press (interference) fit into holes formed and/or machined into the roller cones. The inserts may be formed from, for example, tungsten carbide, natural or synthetic diamond, boron nitride, or any one or combination of hard or superhard materials.

Drill bits of the second category are typically referred to as "fixed cutter" or "drag" bits. This category of bits has no moving elements but rather have a bit body formed from steel or another high strength material and cutters (sometimes referred to as cutter elements, cutting elements or inserts) attached at selected positions to the bit body. For example, the cutters may be formed having a substrate or support stud made of carbide, for example tungsten carbide, and an ultra hard cutting surface layer or "table" made of a polycrystalline diamond material or a polycrystalline boron nitride material deposited onto or otherwise bonded to the substrate at an interface surface.

An example of a prior art drag bit having a plurality of cutters with ultra hard working surfaces is shown in FIG. 1a. A drill bit 10 includes a bit body 12 and a plurality of blades 14 that are formed on the bit body 12. The blades 14 are separated by channels or gaps 16 that enable drilling fluid to flow between and both clean and cool the blades 14 and cutters 18. Cutters 18 are held in the blades 14 at predetermined angular orientations and radial locations to present working surfaces 20 with a desired backrake angle against a formation to be drilled. Typically, the working surfaces 20 are generally perpendicular to the axis 19 and side surface 21 of a cylindrical cutter 18. Thus, the working surface 20 and the side surface 21 meet or intersect to form a circumferential cutting edge 22.

Nozzles 23 are typically formed in the drill bit body 12 and positioned in the gaps 16 so that fluid can be pumped to discharge drilling fluid in selected directions and at selected rates of flow between the cutting blades 14 for lubricating and cooling the drill bit 10, the blades 14, and the cutters 18. The drilling fluid also cleans and removes the cuttings as the drill bit rotates and penetrates the geological formation. The gaps 16, which may be referred to as "fluid courses," are positioned to provide additional flow channels for drilling fluid and to provide a passage for formation cuttings to travel past the drill bit 10 toward the surface of a wellbore (not shown).

The drill bit 10 includes a shank 24 and a crown 26. Shank 24 is typically formed of steel or a matrix material and includes a threaded pin 28 for attachment to a drill string. Crown 26 has a cutting face 30 and outer side surface 32. The particular materials used to form drill bit bodies are selected to provide adequate toughness, while providing good resistance to abrasive and erosive wear. For example, in the case where an ultra hard cutter is to be used, the bit body 12 may be made from powdered tungsten carbide (WC) infiltrated with a binder alloy within a suitable mold form. In one manufacturing process the crown 26 includes a plurality of holes or pockets 34 that are sized and shaped to receive a corresponding plurality of cutters 18.

The combined plurality of surfaces 20 of the cutters 18 effectively forms the cutting face of the drill bit 10. Once the crown 26 is formed, the cutters 18 are positioned in the pockets 34 and affixed by any suitable method, such as brazing, adhesive, mechanical means such as interference fit, or the like. The design depicted provides the pockets 34 inclined with respect to the surface of the crown 26. The pockets 34 are inclined such that cutters 18 are oriented with the working face 20 at a desired rake angle in the direction of rotation of the bit 10, so as to enhance cutting. It should be understood that in an alternative construction (not shown), the cutters may each be substantially perpendicular to the surface of the crown, while an ultra hard surface is affixed to a substrate at an angle on a cutter body or a stud so that a desired rake angle is achieved at the working surface.

A typical cutter 18 is shown in FIG. 1b. The typical cutter 18 has a cylindrical cemented carbide substrate body 38 having an end face or upper surface 54 referred to herein as the "interface surface" 54. An ultra hard material layer (cutting layer) 44, such as polycrystalline diamond or polycrystalline cubic boron nitride layer, forms the working surface 20 and the cutting edge 22. A bottom surface 52 of the ultra hard material layer 44 is bonded on to the upper surface 54 of the substrate 38. The bottom surface 52 and the upper surface 54 are herein collectively referred to as the interface 46. The top exposed surface or working surface 20 of the cutting layer 44 is opposite the bottom surface 52. The cutting layer 44 typically has a flat or planar working surface 20, but may also have a curved exposed surface, that meets the side surface 21 at a cutting edge 22.

Generally speaking, the process for making a cutter 18 employs a body of tungsten carbide as the substrate 38. The carbide body is placed adjacent to a layer of ultra hard material particles such as diamond or cubic boron nitride particles and the combination is subjected to high temperature at a pressure where the ultra hard material particles are thermodynamically stable. This results in recrystallization and formation of a polycrystalline ultra hard material layer, such as a polycrystalline diamond or polycrystalline cubic boron nitride layer, directly onto the upper surface 54 of the cemented tungsten carbide substrate 38.

One type of ultra hard working surface 20 for fixed cutter drill bits is formed as described above with polycrystalline diamond on the substrate of tungsten carbide, typically known as a polycrystalline diamond compact (PDC), PDC cutters, PDC cutting elements, or PDC inserts. Drill bits made using such PDC cutters 18 are known generally as PDC bits. While the cutter or cutter insert 18 is typically formed using a cylindrical tungsten carbide "blank" or substrate 38 which is sufficiently long to act as a mounting stud 40, the substrate 38 may also be an intermediate layer bonded at another interface to another metallic mounting stud 40.

The ultra hard working surface 20 is formed of the polycrystalline diamond material, in the form of a cutting layer 44 (sometimes referred to as a "table") bonded to the substrate 38 at an interface 46. The top of the ultra hard layer 44 provides a working surface 20 and the bottom of the ultra hard layer cutting layer 44 is affixed to the tungsten carbide substrate 38 at the interface 46. The substrate 38 or stud 40 is brazed or otherwise bonded in a selected position on the crown of the drill bit body 12 (FIG. 1a). As discussed above with reference to FIG. 1a, the PDC cutters 18 are typically held and brazed into pockets 34 formed in the drill bit body at predetermined positions for the purpose of receiving the cutters 18 and presenting them to the geological formation at a rake angle.

Bits 10 using conventional PDC cutters 18 are sometimes unable to sustain a sufficiently low wear rate at the cutter temperatures generally encountered while drilling in abrasive and hard rock. These temperatures may affect the life of the bit 10, especially when the temperatures reach 700-750° C., resulting in structural failure of the ultra hard layer 44 or PDC cutting layer. A PDC cutting layer includes individual diamond "crystals" that are interconnected. The individual diamond crystals thus form a lattice structure. A metal catalyst, such as cobalt may be used to promote recrystallization of the diamond particles and formation of the lattice structure. Thus, cobalt particles are typically found within the interstitial spaces in the diamond lattice structure. Cobalt has a significantly different coefficient of thermal expansion as compared to diamond. Therefore, upon heating of a diamond table, the cobalt and the diamond lattice will expand at different rates, causing cracks to form in the lattice structure and resulting in deterioration of the diamond table.

It has been found by applicants that many cutters 18 develop cracking, spalling, chipping and partial fracturing of the ultra hard material cutting layer 44 at a region of cutting layer subjected to the highest loading during drilling. This region is referred to herein as the "critical region" 56. The critical region 56 encompasses the portion of the ultra hard material layer 44 that makes contact with the earth formations during drilling. The critical region 56 is subjected to high magnitude stresses from dynamic normal loading, and shear loadings imposed on the ultra hard material layer 44 during drilling. Because the cutters are typically inserted into a drag bit at a rake angle, the critical region includes a portion of the ultra hard material layer near and including a portion of the layer's circumferential edge 22 that makes contact with the earth formations during drilling.

The high magnitude stresses at the critical region 56 alone or in combination with other factors, such as residual thermal stresses, can result in the initiation and growth of cracks 58 across the ultra hard layer 44 of the cutter 18. Cracks of sufficient length may cause the separation of a sufficiently large piece of ultra hard material, rendering the cutter 18 ineffective or resulting in the failure of the cutter 18. When this happens, drilling operations may have to be ceased to allow for recovery of the drag bit and replacement of the ineffective or failed cutter. The high stresses, particularly shear stresses, may also result in delamination of the ultra hard layer 44 at the interface 46.

In some drag bits, PDC cutters 18 are fixed onto the surface of the bit 10 such that a common cutting surface contacts the formation during drilling. Over time and/or when drilling certain hard but not necessarily highly abrasive rock formations, the edge 22 of the working surface 20 that constantly contacts the formation begins to wear down, forming a local wear flat, or an area worn disproportionately to the remainder of the cutting element. Local wear flats may result in longer drilling times due to a reduced ability of the drill bit to effectively penetrate the work material and a loss of rate of penetration caused by dulling of edge of the cutting element. That is, the worn PDC cutter acts as a friction bearing surface that generates heat, which accelerates the wear of the PDC cutter and slows the penetration rate of the drill. Such flat surfaces effectively stop or severely reduce the rate of formation cutting because the conventional PDC cutters are not able to adequately engage and efficiently remove the formation material from the area of contact. Additionally, the cutters are typically under constant thermal and mechanical load. As a result, heat builds up along the cutting surface, and results in cutting element fracture. When a cutting element breaks, the drilling operation may sustain a loss of rate of penetration, and additional damage to other cutting elements, should the broken cutting element contact a second cutting element.

Additionally, another factor in determining the longevity of PDC cutters is the generation of heat at the cutter contact point, specifically at the exposed part of the PDC layer caused by friction between the PCD and the work material. This heat causes thermal damage to the PCD in the form of cracks which lead to spalling of the polycrystalline diamond layer, delamination between the polycrystalline diamond and substrate, and back conversion of the diamond to graphite causing rapid abrasive wear. The thermal operating range of conventional PDC cutters is typically 750° C. or less.

In U.S. Pat. No. 4,553,615, a rotatable cutting element for a drag bit was disclosed with an objective of increasing the lifespan of the cutting elements and allowing for increased wear and cuttings removal. The rotatable cutting elements disclosed in the '615 patent include a thin layer of an agglomerate of diamond particles on a carbide backing layer having a carbide spindle, which may be journalled in a bore in a bit, optionally through an annular bush. With significant increases in loads and rates of penetration, the cutting element of the '615 patent is likely to fail by one of several failure modes. Firstly, thin layer of diamond is prone to chipping and fast wearing. Secondly, geometry of the cutting element would likely be unable to withstand heavy loads, resulting in fracture of the element along the carbide spindle. Thirdly, the retention of the rotatable portion is weak and may cause the rotatable portion to fall out during drilling.

Accordingly, there exists a continuing need for cutting elements that may stay cool and avoid the generation of local wear flats.

SUMMARY OF INVENTION

In one aspect, embodiments disclosed herein relate to a cutting element for a drill bit that includes an outer support element having at least a bottom portion and a side portion; and an inner rotatable cutting element, a portion of which is disposed in the outer support element, wherein the inner rotatable cutting element includes a substrate and a diamond cutting face having a thickness of at least 0.050 inches disposed on an upper surface of the substrate; and wherein a distance from an upper surface of the diamond cutting face to a bearing surface between the inner rotatable cutting element and the outer support element ranges from 0 to about 0.300 inches.

In another aspect, embodiments disclosed herein relate to a cutting element that includes an outer support element having at least a bottom portion and a side portion; an inner rotatable cutting element, a portion of which is disposed in the outer support element, wherein the inner rotatable cutting element includes a substrate and a diamond cutting face having a thickness of at least 0.050 inches disposed on an upper surface of the substrate; and a retention mechanism for retaining the inner rotatable cutting element in the outer support element.

In another aspect, embodiments disclosed herein relate to a cutting element that includes an outer support element; and an inner rotatable cutting element, a portion of which is disposed in the outer support element, wherein the inner rotatable cutting element includes a substrate and a diamond cutting face having a thickness of at least 0.050 inches disposed on an upper surface of the substrate; and wherein a first portion of the outer support element and the inner rotatable cutting element comprise conical bearing surfaces therebetween.

In another aspect, embodiments disclosed herein relate to a cutting element that includes an outer support element; and an inner rotatable cutting element, a portion of which is disposed in the outer support element, wherein the inner rotatable cutting element includes a substrate and a diamond cutting face having a thickness of at least 0.050 inches disposed on an upper surface of the substrate; and wherein the outer support element and the inner rotatable cutting element comprise bearing surfaces therebetween, wherein at least a portion of the bearing surfaces comprise diamond particles.

In another aspect, embodiments disclosed herein relate to a cutting element that includes an outer support element; and an inner rotatable cutting portion, a portion of which is disposed in the outer support element, wherein the inner rotatable cutting element includes a substrate and a diamond cutting face having a thickness of at least 0.050 inches disposed on an upper surface of the substrate; and wherein at least a portion of the diamond cutting face is non-planar.

In yet another aspect, embodiments disclosed herein relate to a cutting element that includes an outer support element; and an inner rotatable cutting portion, a portion of which is disposed in the outer support element, wherein the inner rotatable cutting element includes a substrate and a diamond cutting face having a thickness of at least 0.050 inches disposed on an upper surface of the substrate; and wherein at least a portion of the inner rotatable cutting element comprises surface alterations.

Other aspects and advantages of the invention will be apparent from the following description and the appended claims.

DETAILED DESCRIPTION

In one aspect, embodiments disclosed herein relate to rotatable cutting structures for drill bits. Specifically, embodiments disclosed herein relate to a cutting element that includes an inner rotatable cutting element and an outer, static support element, wherein a portion of the inner rotatable cutting element is surrounded by the outer support element.

Generally, cutting elements described herein allow at least one surface or portion of the cutting element to rotate as the cutting elements contact a formation. As the cutting element contacts the formation, the cutting action may allow portion of the cutting element to rotate around a cutting element axis extending through the cutting element. Rotation of a portion of the cutting structure may allow for a cutting surface to cut the formation using the entire outer edge of the cutting surface, rather than the same section of the outer edge, as observed in a conventional cutting element.

The rotation of the inner rotatable cutting element may be controlled by the side cutting force and the frictional force between the bearing surfaces. If the side cutting force generates a torque which can overcome the torque from the frictional force, the rotatable portion will have rotating motion. The side cutting force may be affected by cutter side rake, back rake and geometry, including the working surface patterns disclosed herein. Additionally, the side cutting force may be affected by the surface finishing of the surfaces of the cutting element components, the frictional properties of the formation, as well as drilling parameters, such as depth of cut. The frictional force at the bearing surfaces may affected, for example, by surface finishing, mud intrusion, etc. The design of the rotatable cutters disclosed herein may be selected to ensure that the side cutting force overcomes the frictional force to allow for rotation of the rotatable portion.

Figure 1A:
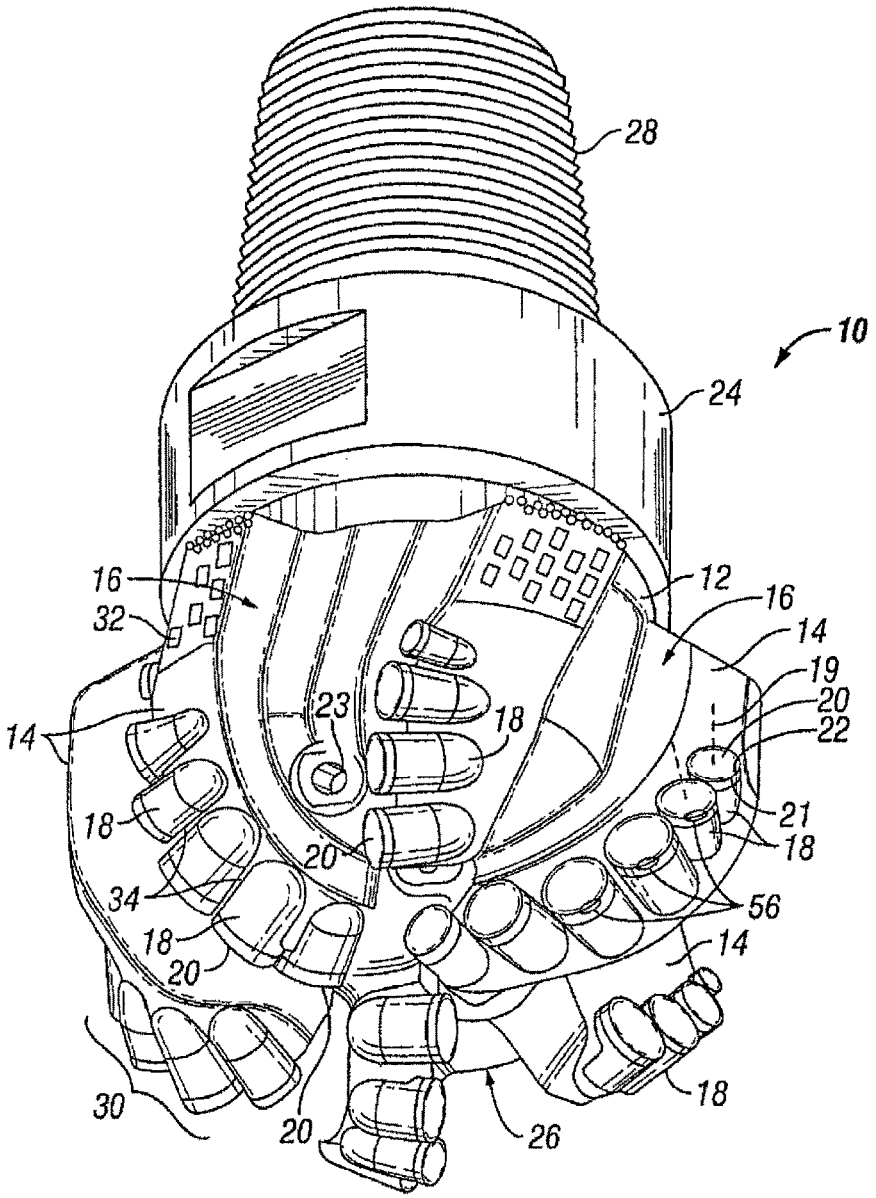
Prior Art FIG. 1A
FIG. 1A shows a perspective view of a conventional fixed cutter bit.
Figure 1B:
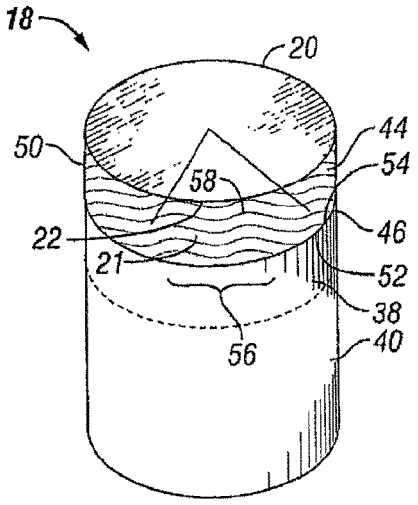
Prior Art FIG. 1B
FIG. 1B shows a perspective view of a conventional PDC cutter.
Figure 2A:
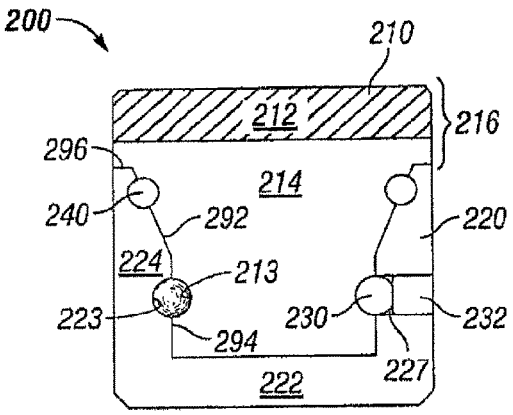
FIG. 2A-B show a schematic of a cutting element according to one embodiment disclosed herein.
Figure 2B:
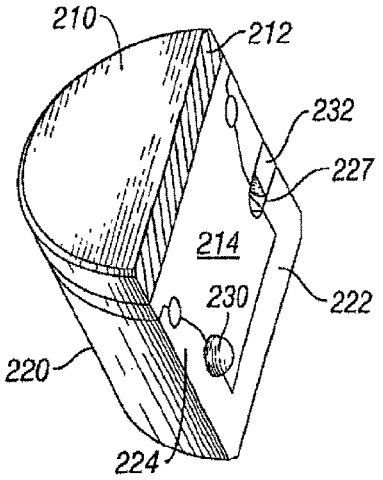

Referring to FIG. 2A-B, a cutting element in accordance with one embodiment of the present disclosure is shown. As shown in this embodiment, cutting element 200 includes an inner rotatable (dynamic) cutting element 210 which is partially disposed in, and thus, partially surrounded by an outer support (static) element 220. Outer support element 220 includes a bottom portion 222 and a side portion 224. Inner rotatable cutting element 210, partially disposed within the cavity defined by the bottom portion 222 and side portion 224, includes a cutting face 212 portion disposed on an upper surface of substrate 214. Additionally, while bottom portion 222 and side portion 224 of the outer support element 220 are shown in FIG. 2 as being integral, one of ordinary skill in the art would appreciate that depending on the geometry of the cutting element components, the bottom and side portions may alternatively be two separate pieces bonded together. In yet another embodiment, the outer support element 220 may be formed from two separate pieces bonded together on a vertical plane (with respect to the cutting element axis, for example) to surround at least a portion of the inner rotatable cutting element 210.

In various embodiments, the cutting face of the inner rotatable cutting element may include an ultra hard layer that may be comprised of a polycrystalline diamond table, a thermally stable diamond layer (i.e., having a thermal stability greater than that of conventional polycrystalline diamond, 750° C.), or other ultra hard layer such as a cubic boron nitride layer.

As known in the art, thermally stable diamond may be formed in various manners. A typical polycrystalline diamond layer includes individual diamond "crystals" that are interconnected. The individual diamond crystals thus form a lattice structure. A metal catalyst, such as cobalt, may be used to promote recrystallization of the diamond particles and formation of the lattice structure. Thus, cobalt particles are typically found within the interstitial spaces in the diamond lattice structure. Cobalt has a significantly different coefficient of thermal expansion as compared to diamond. Therefore, upon heating of a diamond table, the cobalt and the diamond lattice will expand at different rates, causing cracks to form in the lattice structure and resulting in deterioration of the diamond table.

To obviate this problem, strong acids may be used to "leach" the cobalt from a polycrystalline diamond lattice structure (either a thin volume or entire tablet) to at least reduce the damage experienced from heating diamond-cobalt composite at different rates upon heating. Examples of "leaching" processes can be found, for example, in U.S. Pat. Nos. 4,288,248 and 4,104,344. Briefly, a strong acid, typically hydrofluoric acid or combinations of several strong acids may be used to treat the diamond table, removing at least a portion of the co-catalyst from the PDC composite. Suitable acids include nitric acid, hydrofluoric acid, hydrochloric acid, sulfuric acid, phosphoric acid, or perchloric acid, or combinations of these acids. In addition, caustics, such as sodium hydroxide and potassium hydroxide, have been used to the carbide industry to digest metallic elements from carbide composites. In addition, other acidic and basic leaching agents may be used as desired. Those having ordinary skill in the art will appreciate that the molarity of the leaching agent may be adjusted depending on the time desired to leach, concerns about hazards, etc.

By leaching out the cobalt, thermally stable polycrystalline (TSP) diamond may be formed. In certain embodiments, only a select portion of a diamond composite is leached, in order to gain thermal stability without losing impact resistance. As used herein, the term TSP includes both of the above (i.e., partially and completely leached) compounds. Interstitial volumes remaining after leaching may be reduced by either furthering consolidation or by filling the volume with a secondary material, such by processes known in the art and described in U.S. Pat. No. 5,127,923, which is herein incorporated by reference in its entirety.

Alternatively, TSP may be formed by forming the diamond layer in a press using a binder other than cobalt, one such as silicon, which has a coefficient of thermal expansion more similar to that of diamond than cobalt has. During the manufacturing process, a large portion, 80 to 100 volume percent, of the silicon reacts with the diamond lattice to form silicon carbide which also has a thermal expansion similar to diamond. Upon heating, any remaining silicon, silicon carbide, and the diamond lattice will expand at more similar rates as compared to rates of expansion for cobalt and diamond, resulting in a more thermally stable layer. PDC cutters having a TSP cutting layer have relatively low wear rates, even as cutter temperatures reach 1200° C. However, one of ordinary skill in the art would recognize that a thermally stable diamond layer may be formed by other methods known in the art, including, for example, by altering processing conditions in the formation of the diamond layer.

The substrate on which the cutting face is disposed may be formed of a variety of hard or ultra hard particles. In one embodiment, the substrate may be formed from a suitable material such as tungsten carbide, tantalum carbide, or titanium carbide. Additionally, various binding metals may be included in the substrate, such as cobalt, nickel, iron, metal alloys, or mixtures thereof. In the substrate, the metal carbide grains are supported within the metallic binder, such as cobalt. Additionally, the substrate may be formed of a sintered tungsten carbide composite structure. It is well known that various metal carbide compositions and binders may be used, in addition to tungsten carbide and cobalt. Thus, references to the use of tungsten carbide and cobalt are for illustrative purposes only, and no limitation on the type substrate or binder used is intended. In another embodiment, the substrate may also be formed from a diamond ultra hard material such as polycrystalline diamond and thermally stable diamond. While the illustrated embodiments show the cutting face and substrate as two distinct pieces, one of skill in the art should appreciate that it is within the scope of the present disclosure the cutting face and substrate are integral, identical compositions. In such an embodiment, it may be preferable to have a single diamond composite forming the cutting face and substrate or distinct layers.

The outer support element may be formed from a variety of materials. In one embodiment, the outer support element may be formed of a suitable material such as tungsten carbide, tantalum carbide, or titanium carbide. Additionally, various binding metals may be included in the outer support element, such as cobalt, nickel, iron, metal alloys, or mixtures thereof, such that the metal carbide grains are supported within the metallic binder. In a particular embodiment, the outer support element is a cemented tungsten carbide with a cobalt content ranging from 6 to 13 percent.

In other embodiments, the outer support element may be formed of alloy steels, nickel-based alloys, and cobalt-based alloys. One of ordinary skill in the art would also recognize that cutting element components may be coated with a hard-facing material for increased erosion protection. Such coatings may be applied by various techniques known in the art such as, for example, detonation gun (d-gun) and spray-and-fuse techniques.

Referring again to FIG. 2A, as the inner rotatable cutting element 210 is only partially disposed in and/or surrounded by the outer support element 220, at least a portion of the inner rotatable cutting element 210 may be referred to as an "exposed portion" 216 of the inner rotatable cutting element 210. Depending on the thickness of the exposed portion 216, exposed portion 216 may include at least a portion of the cutting face 212 or the cutting face 212 and a portion of the substrate 214. As shown in FIG. 2, exposed portion 216 includes cutting face 212 and a portion of substrate 214. However, one of ordinary skill in the art would recognize that while the exposed portion 216 is shown as being constant across the entire diameter or width of the inner rotatable cutting element 210, in the embodiment shown in FIG. 2, depending on the geometry of the cutting element components, the exposed portion 216 of the inner rotatable cutting element 210 may vary, as demonstrated by some of the figures described below.

In a particular embodiment, the cutting face of the inner rotatable cutting element has a thickness of at least 0.050 inches. However, one of ordinary skill in the art would recognize that depending on the geometry and size of the cutting structure, other thicknesses may be appropriate.

In another embodiment, the inner rotatable cutting element may have a non-planar interface between the substrate and the cutting face. A non-planar interface between the substrate and cutting face increases the surface area of a substrate, thus may improve the bonding of the cutting face to the substrate. In addition, the non-planar interfaces may increase the resistance to shear stress that often results in delamination of the diamond tables, for example.

One example of a non-planar interface between a carbide substrate and a diamond layer is described, for example, in U.S. Pat. No. 5,662,720, wherein an "egg-carton" shape is formed into the substrate by a suitable cutting, etching, or molding process. Other non-planar interfaces may also be used including, for example, the interface described in U.S. Pat. No. 5,494,477. According to one embodiment of the present disclosure, a cutting face is deposited onto the substrate having a non-planar surface.

Figure 3A:
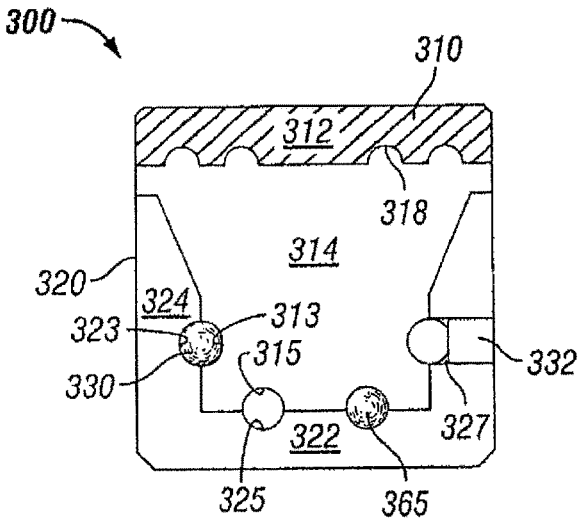
FIG. 3A-B show a schematic of a cutting element according to one embodiment disclosed herein.
Figure 3B:
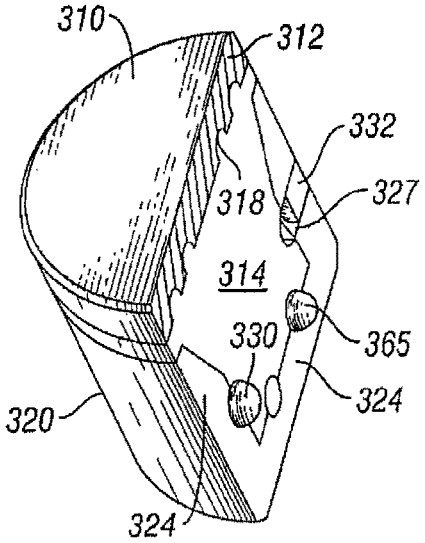

Referring to FIG. 3A-B, a cutting element having a non-planar interface is shown. As shown in this embodiment, cutting element 300 includes an inner rotatable (dynamic) cutting element 310 which is partially disposed in, and thus, partially surrounded by an outer support (static) element 320. Outer support element 320 includes a bottom portion 322 and a side portion 324 Inner rotatable cutting element 310, partially disposed within the cavity defined by the bottom portion 322 and side portion 324, includes a cutting face 312 portion disposed on an upper surface 318 of substrate 314. As shown in FIG. 3A-B, upper surface 318 of substrate 314 is non-planar, creating a non-planar interface between substrate 314 and 312.

The inner rotatable cutting element may be retained in the outer support element by a variety of mechanisms, including for example, ball bearings, pins, and mechanical interlocking. In various embodiments, a single retention system may be used, while, alternatively, in other embodiments, multiple retention systems may be used Referring again to FIGS. 2A-3B, cutting elements having a ball bearing retention system are shown. As shown in these embodiments, inner rotatable cutting element 210, 310 and outer support element 220, 320 include substantially aligned/matching grooves 213, 313 and 223, 323 in the side surface of the substrate 214, 314 and inner surface of the side portion 224, 324, respectively. Occupying the space defined by grooves 213, 313 and 223, 323, are retention balls (i.e., ball bearings) 230, 330 to assist in retaining inner rotatable cutting element 210, 310 in outer support element 220, 320. Balls may be inserted through pinhole 227, 327 in side portion 224, 324. In such an embodiment, following assembly of the cutting element 200, 300, pinhole 227, 327 may be sealed with a pin or plug 232, 332 or any other material capable of filling pinhole 227, 327 without impairing the function of retention balls/bearings 230, 330. In alternative embodiments, cutting element 200, 300 may be formed from multiple pieces as described above such that pinhole 227, 327 and plug 232, 332 are not required.

Balls 230, 330 may be made any material (e.g., steel or carbides) capable of withstanding compressive forces acting thereupon while cutting element 200, 300 engages the formation. In a particular embodiment the balls may be formed of tungsten carbide or silicon carbide. If tungsten carbide balls are used, it may be preferable to use a cemented tungsten carbide composition varying from that of the outer support element and/or substrate. Balls 230, 330 may be of any size and of which may be variable to change the rotational speed of inner rotatable cutting element 210, 310. In certain embodiments, the rotatable speed of dynamic portion 210, 310 may be between one and five rotations per minute so that the surface of cutting face 212, 312 may remain sharp without compromising the integrity of cutting element 200, 300.

Referring again to FIG. 4, a cutting element having a pin retention system is shown. As shown in this embodiment, cutting element 400 includes an inner rotatable (dynamic) cutting element 410 which is partially disposed in, and thus, partially surrounded by an outer support (static) element 420. Outer support element 420 includes a bottom portion 422 and a side portion 424. Inner rotatable cutting element 410, partially disposed within the cavity defined by the bottom portion 422 and side portion 424, includes a cutting face 412 portion disposed on an upper surface of substrate 414. Further, inner rotatable cutting element 410 includes a groove 413 in the side surface of substrate 414. Substantially aligned with the groove 413 is a pin 430 extending from the inner surface of side portion 424. Pin 430 extends radially inward from side portion 424 into the space defined by groove 413 to retain inner cutting element 410 in outer support element 510.

Figure 5A:
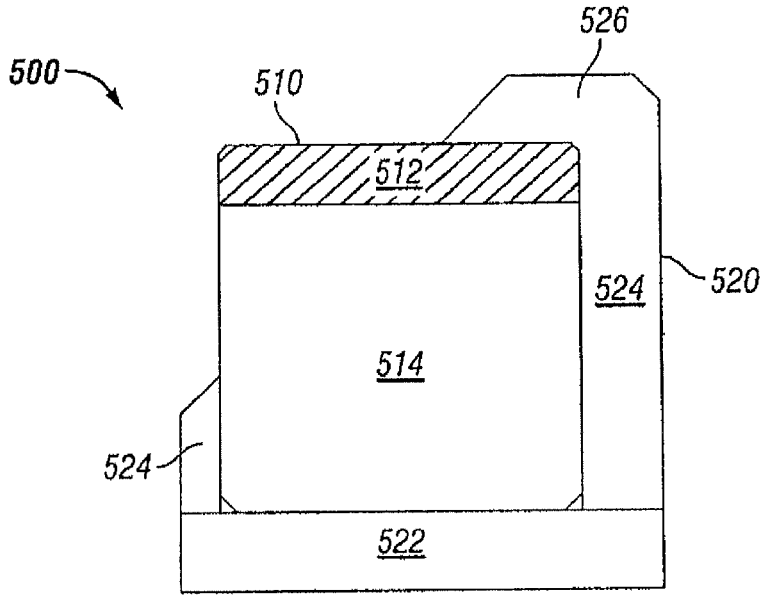
FIGS. 5A-B show a schematic of a cutting element according to one embodiment disclosed herein.
Figure 5B:
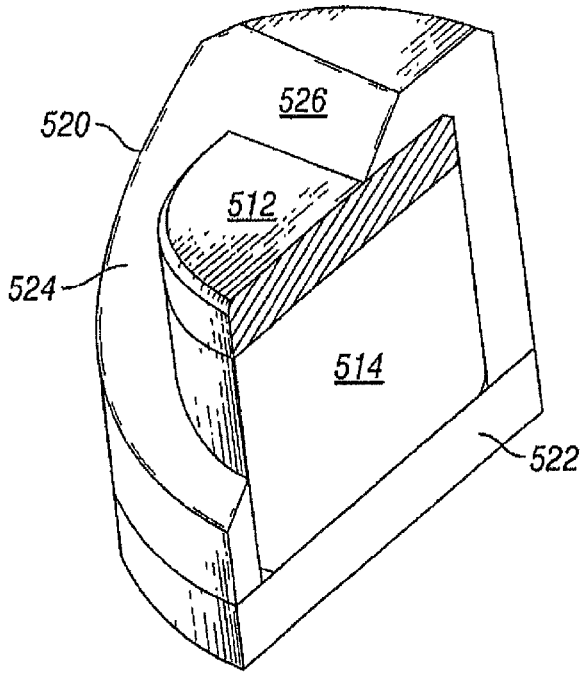

Referring to FIGS. 5A-B, a cutting element having a mechanical interlocking retention system is shown. As shown in this embodiment, cutting element 500 includes an inner rotatable (dynamic) cutting element 510 which is partially disposed in and thus, partially surrounded by an outer support (static) element 520. Outer support element 520 includes a bottom portion 522, a side portion 524, and a top portion 526. Inner rotatable cutting element 510 includes a cutting face 512 portion disposed on an upper surface of substrate 514. Inner rotatable cutting element is disposed within the cavity defined by the bottom portion 522, side portion 524, and top portion 526. Due to the structural nature of this embodiment, inner rotatable cutting element is mechanically retained in the outer support element 520 cavity by bottom portion 522, side portion 524, and top portion 526. As shown in FIG. 5, top portion 526 extends partially over the upper surface of cutting face 512 so as to retain inner rotatable cutting element 510 and also allow for cutting of a formation by the inner rotatable cutting element 510, and specifically, cutting face 512.

Figure 6A:
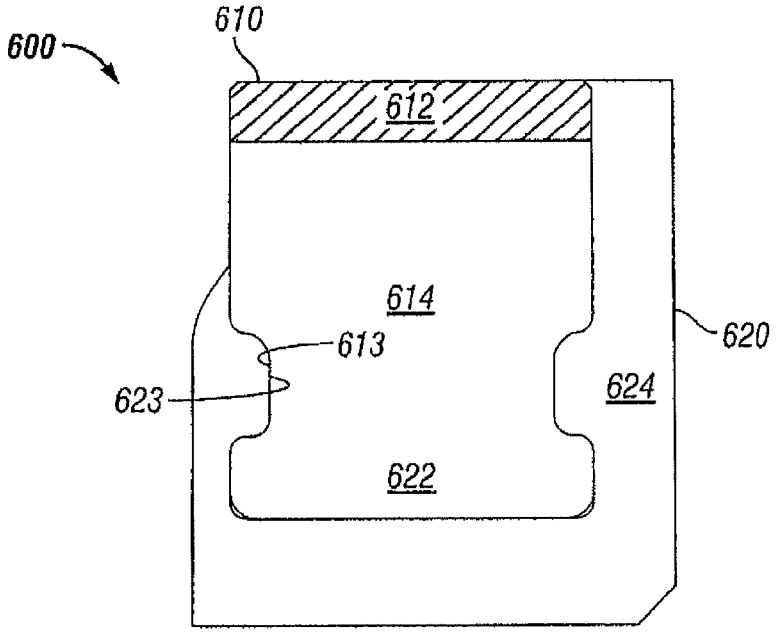
FIGS. 6A-B show a schematic of a cutting element according to one embodiment disclosed herein.
Figure 6B:
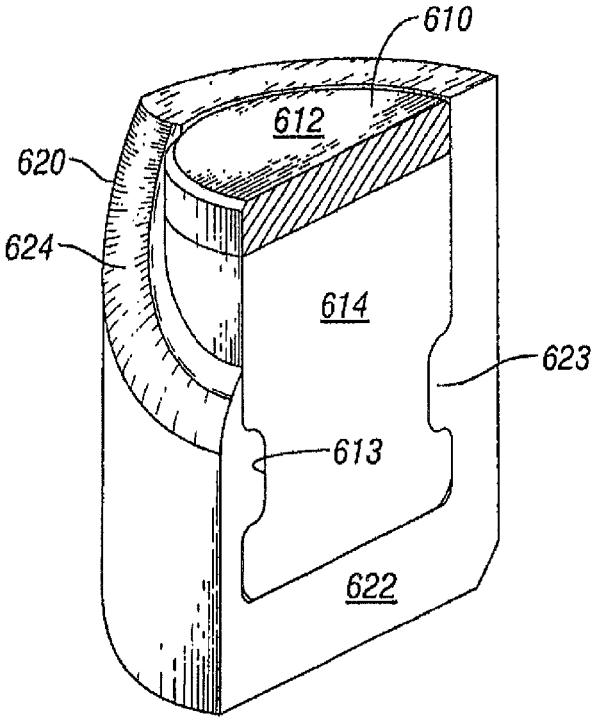

Referring to FIGS. 6A-B, a cutting element having another mechanical interlocking retention system is shown. As shown in this embodiment, cutting element 600 includes an inner rotatable (dynamic) cutting element 610 which is partially disposed in, and thus, partially surrounded by an outer support (static) element 620. Outer support element 620 includes a bottom portion 622 and a side portion 624. Inner rotatable cutting element 610, partially disposed within the cavity defined by the bottom portion 622 and side portion 624, includes a cutting face 612 portion disposed on an upper surface of substrate 614. Further, inner rotatable cutting element 610 and outer support element 620 include substantially aligned/matching groove 613 and protrusion 623 in the side surface of the substrate 614 and inner surface of the side portion 624, respectively. As non-planar mating surfaces, groove 613 and protrusion 623 assist in retaining inner rotatable cutting element 610 in outer support element 620. One of skill in the art would recognize that other non-planar, mating surfaces in substrate 614 and side portion 624 may be formed to retain inner rotatable cutting element 610 in outer support element 620. For example, substrate 614 may include a protrusion that may be substantially aligned with a groove in side portion 624.

Figure 4:
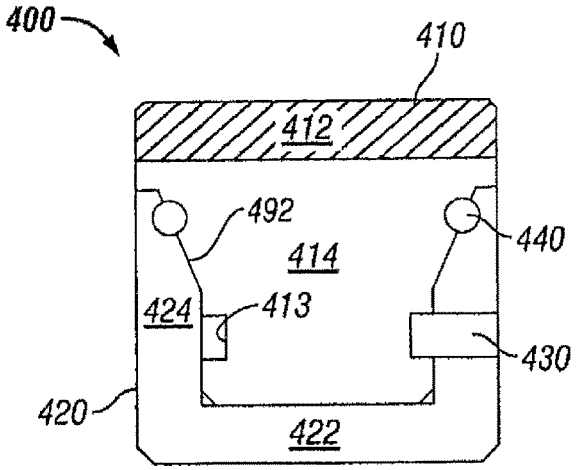
FIG. 4 shows a schematic of a cutting element according to one embodiment disclosed herein.

In various embodiments including, for example, those shown in FIGS. 2A-B and 4 above, the cutting elements disclosed herein may include a seal between the inner rotatable cutting element and the outer support element. As shown in FIGS. 2A-B and 4, a seal or sealing element 240, 440 is disposed between inner rotatable cutting element 210, 410 and outer support element 220, 420, specifically, on the conical surface of the inner rotatable cutting element 210, 410. Sealing element 240, 440 may be provided, in one embodiment, to reduce contact between the inner rotatable cutting element 210, 410 and the outer support element 220, 420 and may be made from any number of materials (e.g., rubbers, elastomers, and polymers) known to one of ordinary skill in the art. As such, sealing element 240, 440 may reduce heat generated by friction as inner rotatable cutting element 210, 410 rotates within outer support element 220, 420. Further, sealing element 240, 440 may also act to reduce galling or seizure of bearings 230 or pin 430 due to mud infusion or compaction of drill cuttings. In optional embodiments, grease, or any other friction reducing material may be added in the seal groove between inner rotatable cutting element 210, 410 and outer support element 220, 420. Such material may prevent the build-up of heat between the components, thereby extending the life of cutting element 200, 400.

Figure 7A:
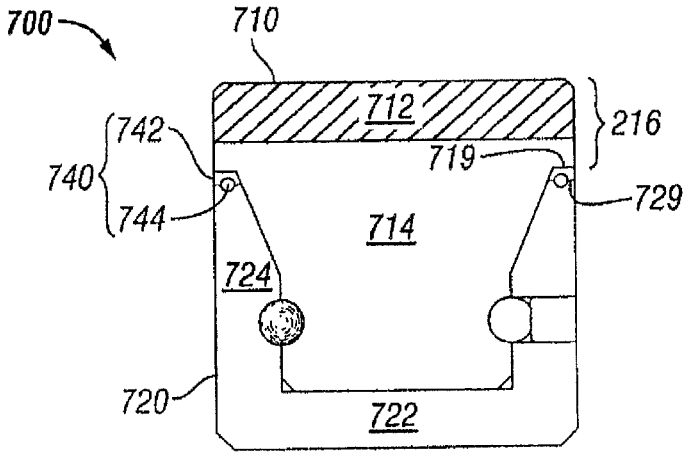
FIG. 7A-B shows a schematic of a cutting element according to one embodiment disclosed herein.
Figure 7B:
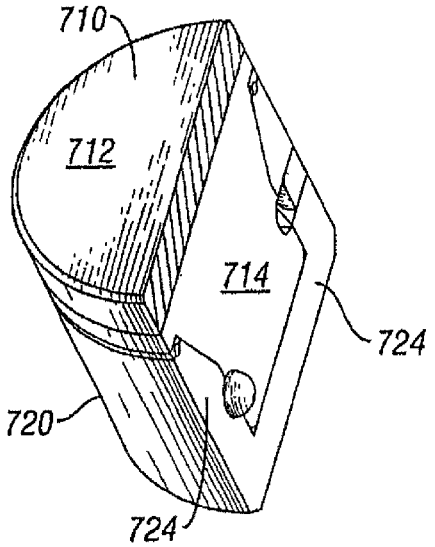

Referring to FIG. 7, a cutting element with alternative seal system is shown. As shown in this embodiment, cutting element 700 includes an inner rotatable (dynamic) cutting element 710 which is partially disposed in, and thus, partially surrounded by an outer support (static) element 720. Outer support element 720 includes a bottom portion 722 and a side portion 724 Inner rotatable cutting element 710, partially disposed within the cavity defined by the bottom portion 722 and side portion 724, includes a cutting face 712 portion disposed on an upper surface of substrate 714. Sealing system 740 is disposed between inner rotatable cutting element 710 and outer support element 720, specifically, as shown in FIG. 7, between an upper surface 729 of outer support element 720 and a lower surface 719 of exposed portion 716 of inner rotatable cutting element 710. Sealing system 740 is a two component system and includes metal seal component 742 and an o-ring component 744.

In one embodiment, the bearing surfaces of the cutting elements disclosed herein may be enhanced to promote rotation of the inner rotatable cutting element in the outer support element. Bearing surface enhancements may be incorporated on a portion of either or both of the inner rotatable cutting element bearing surface and outer support element bearing surface. In a particular embodiment, at least a portion of one of the bearing surfaces may include a diamond bearing surface. According to the present disclosed, a diamond bearing surface may include discrete segments of diamond in some embodiments and a continuous segment in other embodiments. Bearing surfaces that may be used in the cutting elements disclosed herein may include diamond bearing surfaces, such as those disclosed in U.S. Pat. Nos. 4,756,631 and 4,738,322, assigned to the present assignee and incorporated herein by reference in its entirety.

Figure 8A:
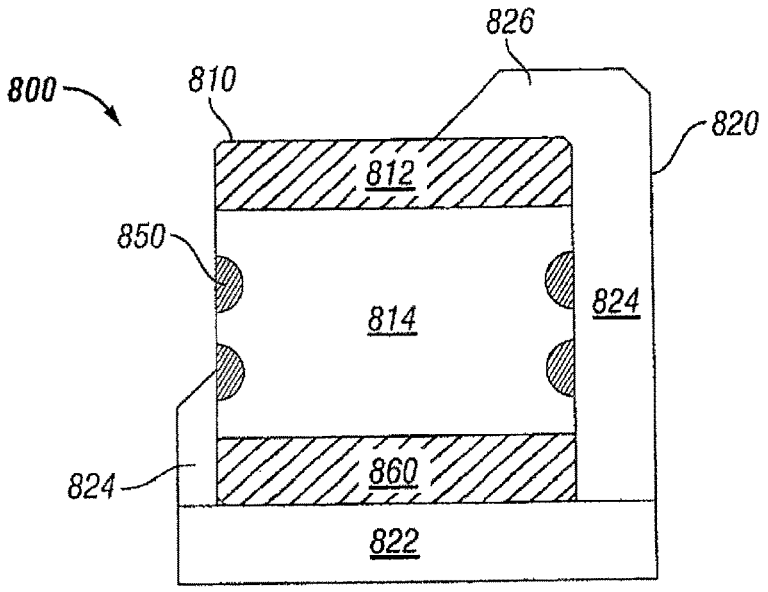
FIGS. 8A-B show a schematic of a cutting element according to one embodiment disclosed herein.
Figure 8B:
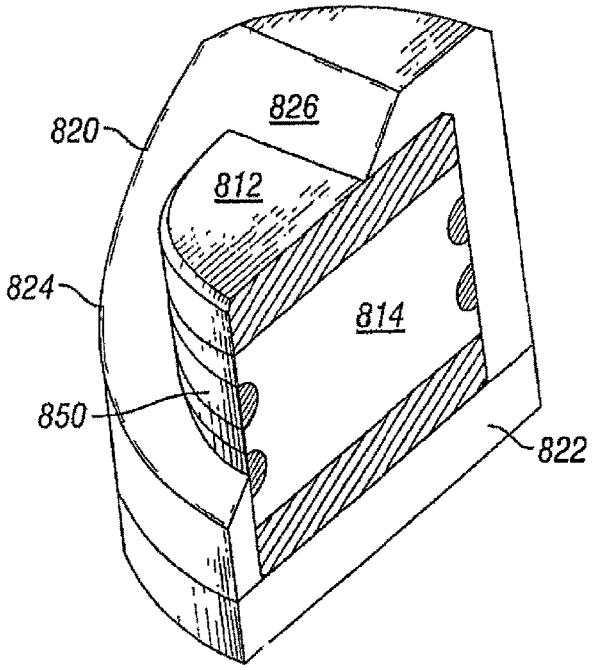
Figure 9A:
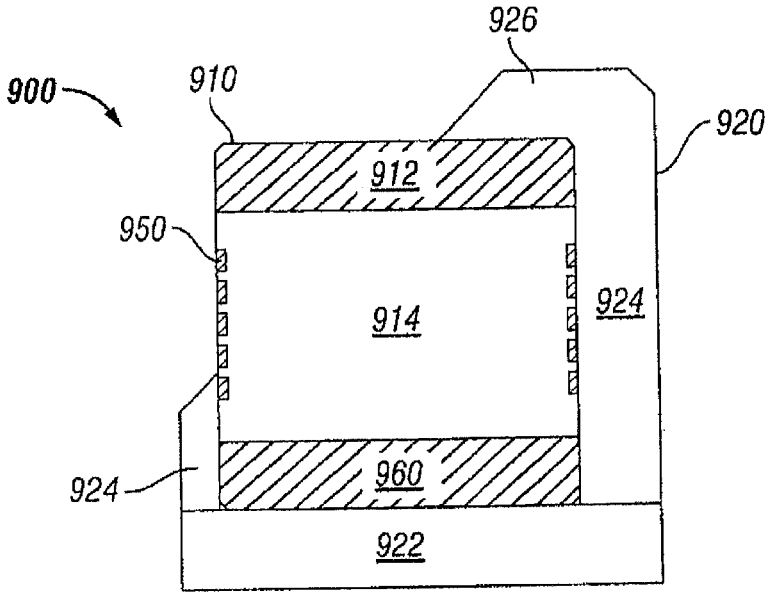
FIGS. 9A-B show a schematic of a cutting element according to one embodiment disclosed herein.
Figure 9B:
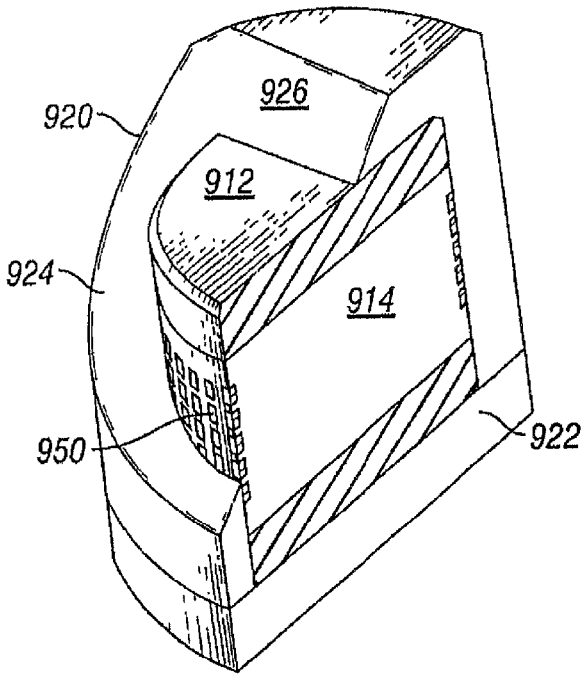
Figure 10A:
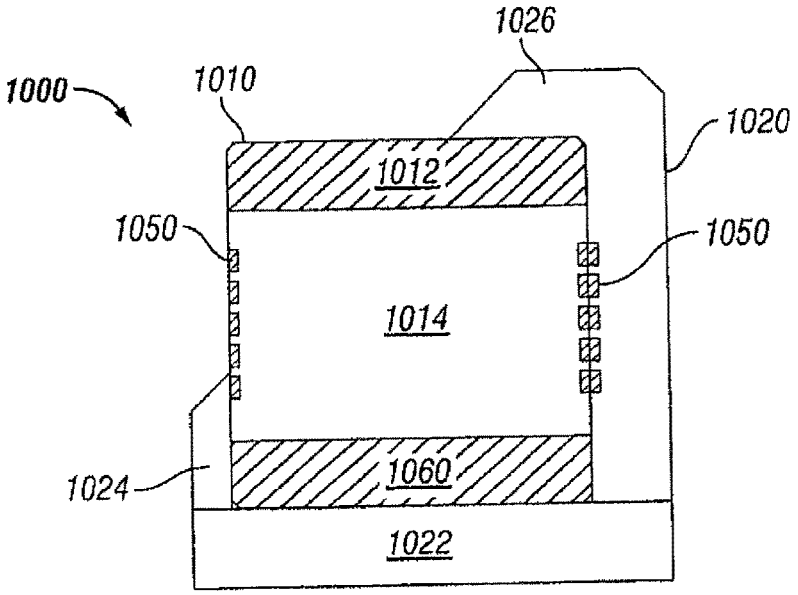
FIGS. 10A-B show a schematic of a cutting element according to one embodiment disclosed herein.
Figure 10B:
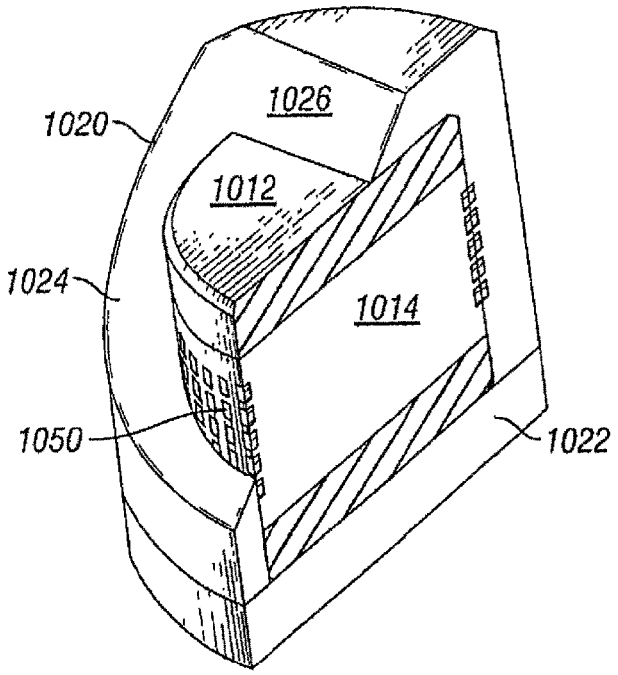

Referring to FIG. 8A-B, a cutting element having a diamond bearing surface is shown. As shown in this embodiment, cutting element 800 includes an inner rotatable (dynamic) cutting element 810 which is partially disposed in, and thus, partially surrounded by an outer support (static) element 820. Outer support element 820 includes a bottom portion 822, a side portion 824, and a top portion 826. Inner rotatable cutting element 810 includes a cutting face 812 portion disposed on an upper surface of substrate 814 Inner rotatable cutting element is disposed within the cavity defined by the bottom portion 822, side portion 824, and top portion 826. Due to the structural nature of this embodiment, inner rotatable cutting element is mechanically retained in the outer support element 820 cavity by bottom portion 822, side portion 824, and top portion 826. As shown in FIGS. 8A-B, top portion 826 extends partially over the upper surface of cutting face 812 so as to retain inner rotatable cutting element 810 and also allow for cutting of a formation by the inner rotatable cutting element 810, and specifically, cutting face 812. Side surface of substrate 814 includes continuous, circumferential diamond bearing surfaces 850. Similar to FIGS. 8A-B, the embodiment shown in FIGS. 9A-B includes diamond bearing surfaces 950 on substrate 914; however, diamond bearing surfaces 950 are discrete segments of diamond along the circumferential side surface of substrate 914. As shown in FIGS. 10A-B, discrete segments of diamond bearing surfaces 1050 are included on the side surface of substrate 1014 and inner surface of side portion 1024. While this illustrated embodiment shows discrete Thus, in some embodiments, diamond-on-diamond bearing surfaces may be provided. This may be achieved by using diamond enhanced bearing surfaces on both the inner rotatable cutting element and outer support element, or alternatively, the substrate may be formed of diamond and diamond enhanced bearing surfaces may be provided on the outer support element. In other embodiments, diamond-on-carbide bearing surfaces may be used, where diamond bearing surfaces may be included on one of the substrate or the outer support element, where carbide comprises the other component.

To further enhance rotation of the inner rotatable cutting element, the bottom mating surfaces of the inner rotatable cutting element and outer support element may be varied. For example, ball bearings may be provided between the two components or, alternatively, one of the surfaces may be contain and/or be formed of diamond.

Referring to FIGS. 8A-10B, cutting elements according to one embodiment of the present disclosure is shown. As shown in these embodiments, inner rotatable cutting element 810, 910, 1010 includes a lower diamond face 860, 960, 1060 on the lower surface of substrate 814, 914, 1014 such that bottom portion 822, 922, 1022 of outer support element 820, 920, 1020 contacts inner rotatable cutting element 810, 910, 1010 at lower diamond face 860, 960, 1060. In alternative embodiments, diamond may be include in discrete regions on the lower surface of substrate 814, 914, 1014 may or in discrete regions or a layer on inner surface of bottom portion 822, 922, 1022 of outer support element 820, 920, 1020.

Figure 11A:
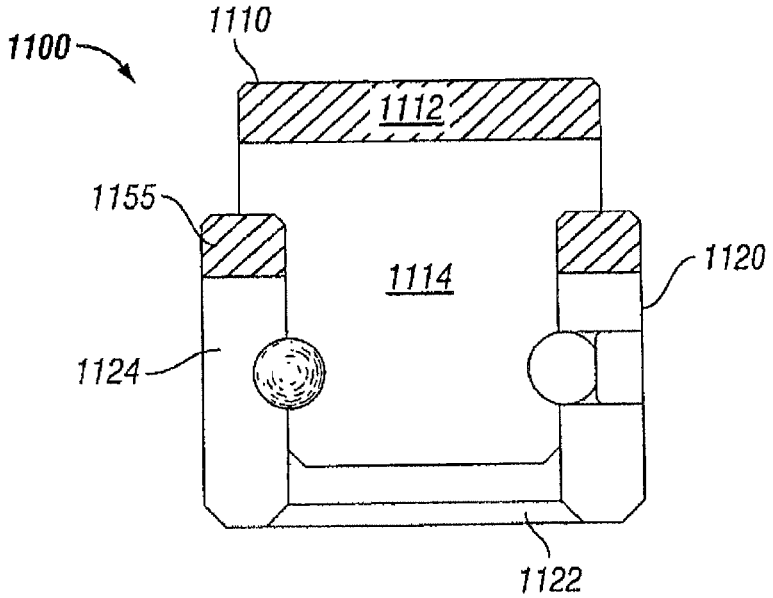
FIG. 11A-B shows a schematic of a cutting element according to one embodiment disclosed herein.
Figure 11B:
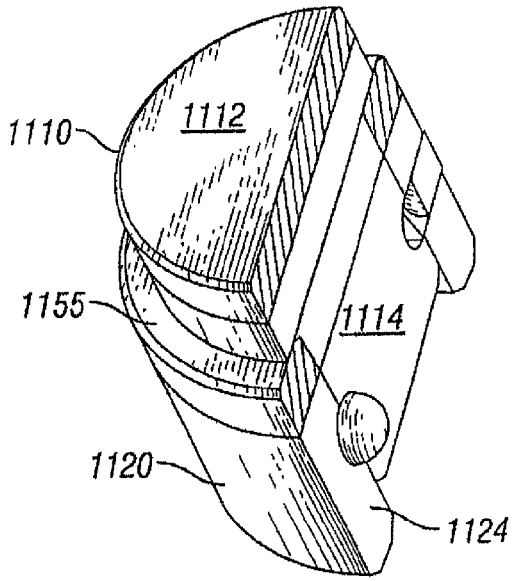

Another embodiment of a diamond enhanced bearing surface is shown in FIG. 11. Referring to FIG. 11, a cutting element 1100 includes an inner rotatable (dynamic) cutting element 1110 which is partially disposed in, and thus, partially surrounded by an outer support (static) element 1120. Outer support element 1120 includes a bottom portion 1122 and a side portion 1124. Inner rotatable cutting element 1110 includes a cutting face 1112 portion disposed on an upper surface of substrate 1114. Inner rotatable cutting element is disposed within the cavity defined by the bottom portion 1122 and side portion 1124. At the upper surface of side portion 1124 of outer support element 1120, a portion of inner rotatable cutting element 1110 is juxtaposed thereto, creating a bearing surface therebetween. As shown in FIG. 11, a circumferential diamond layer 1155 may be disposed on the upper bearing surface of side portion 1124 and contact the inner rotatable cutting element 1110. The diamond layer 1155 may also acts as a cutting mechanism and/or to provide lateral protection to the inner rotatable cutting element 1110 when the bit is subjected to vibration.

Referring again to FIGS. 3A-B, a cutting element according to another embodiment of the present disclosure is shown. As shown in this embodiment, inner rotatable cutting element 310 and outer support element 320 include substantially aligned/matching grooves 315 and 325 in the lower surface of the substrate 314 and inner surface of the bottom portion 322, respectively. Occupying the space defined by grooves 315 and 325, are ball bearings 365 to assist in rotation of inner rotatable cutting element 310 in outer support element 320.

In another embodiment, at least a portion of at least one of the bearing surfaces may be surface treated for optimizing the rotation of the inner rotatable cutting element in the inner support element. Surface treatments suitable for the cutting elements of the present disclosure include addition of a lubricant, applied coatings and surface finishing, for example. In a particular embodiment, a bearing surface may undergo surface finishing such that the surface has a mean roughness of less than about 125 μ-inch Ra, and less than about 32 μinch Ra in another embodiment. In another particular embodiment, a bearing surface may be coated with a lubricious material to facilitate rotation of the inner rotatable cutting element and/or to reduce friction and galling between the inner rotatable cutting element and the outer support element. In a particular embodiment, a bearing surface may be coated with a carbide, nitride, and/or oxide of various metals that may be applied by PVD, CVD or any other deposition techniques known in the art that facilitate bonding to the substrate or base material. In another embodiment, a floating bearing may be included between the bearing surfaces to facilitate rotation. Incorporation of a friction reducing material, such as a grease or lubricant, may allow the surfaces of the inner rotatable cutting element and the outer support element to rotate and contract one another, but result in only minimal heat generation therefrom.

In another embodiment, surface alterations may be included on the working surfaces of the cutting face, the substrate, and/or an inner hole of the inner rotatable cutting element. Surface alterations may be included in the cutting elements of the present disclosure to enhance rotation through hydraulic interactions or physical interactions with the formation. In various embodiments, surface alterations may be etched or machined into the various components, or alternatively formed during sintering or formation of the component, and in some particular embodiments, may have a depth ranging from 0.001 to 0.050 inches. One of ordinary skill in the art would recognize the surface alterations may take any geometric or non-geometric shape on any portion of the inner rotatable cutting element and may be formed in a symmetric or asymmetric manner. Further, depending on the size of the cutting elements, it may be preferable to vary the depth of the surface alterations.

Figure 12A:
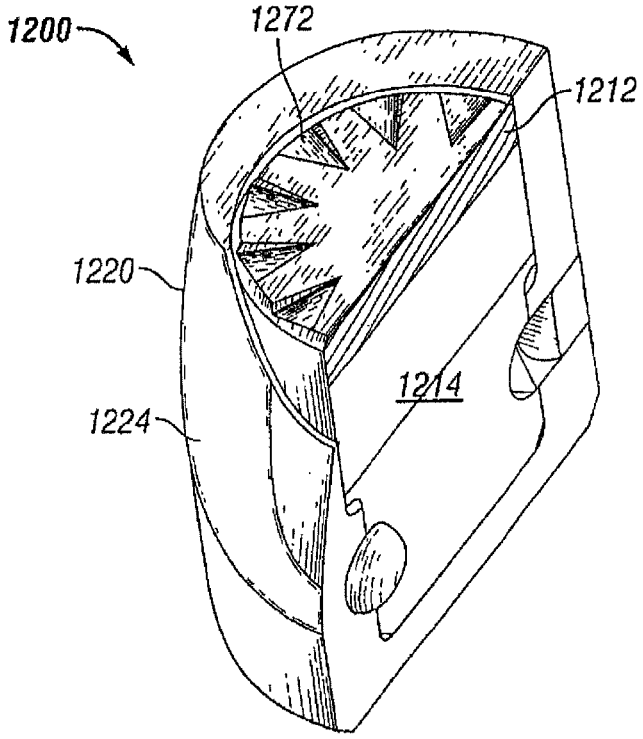
FIGS. 12A-B show a schematic of a cutting element according to one embodiment disclosed herein.
Figure 12B:
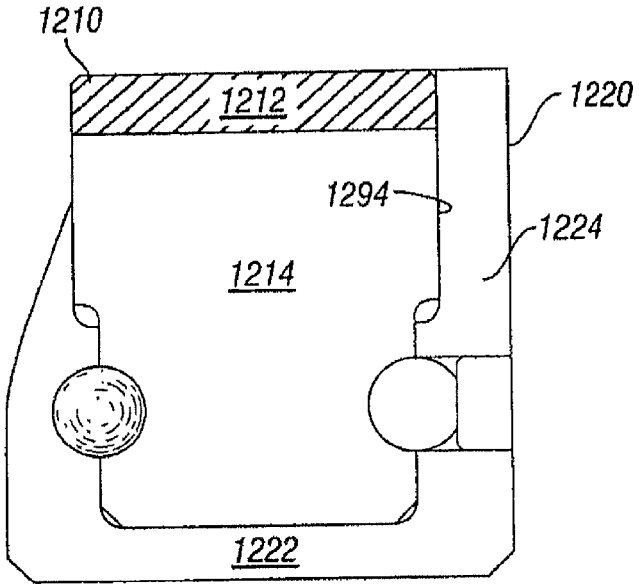

Referring to FIGS. 12A-B, a cutting element having a non-planar cutting face is shown. As shown in this embodiment, cutting element 1200 includes an inner rotatable (dynamic) cutting element 1210 which is partially disposed in, and thus, partially surrounded by an outer support (static) element 1220. Outer support element 1220 includes a bottom portion 1222 and a side portion 1224 Inner rotatable cutting element 1210 includes a cutting face 1212 portion disposed on an upper surface of substrate 1214. Inner rotatable cutting element is disposed within the cavity defined by the bottom portion 1222 and side portion 1224. Cutting face 1212 includes surface alterations 1272 on its top surface. As shown in FIG. 12, surface alterations 1272 are in a serrated manner extending radially from a midpoint on the top surface to the cutting edge 1270. While the surface alterations 1272 shown in FIG. 12 are in a serrated manner with generally sharp edges, it is within the scope of the present disclosure that such surface features used in the cutting elements of the present disclosure may take on a variety of forms (i.e., geometric shapes, waves, sharp, smooth, etc.).

Figure 13:
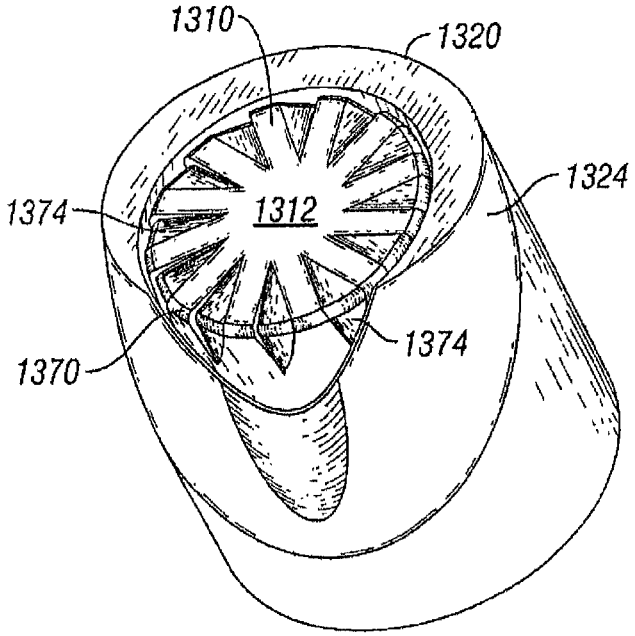
FIG. 13 shows a schematic of a cutting element according to one embodiment disclosed herein.

Referring to FIG. 13, another cutting element having a non-planar cutting face is shown. As shown in this embodiment, cutting element 1300 includes an inner rotatable (dynamic) cutting element 1310 which is partially disposed in, and thus, partially surrounded by an outer support (static) element 1320. Outer support element 1320 includes a bottom portion (now shown) and a side portion 1324. Inner rotatable cutting element 1310 includes a cutting face 1312 portion disposed on an upper surface of substrate (not shown). Inner rotatable cutting element is disposed within the cavity defined by the bottom portion (not shown) and side portion 1324. Cutting face 1312 includes surface alterations 1374 on its top surface and side surface, collectively, the working surface of cutting face 1312. As shown in FIG. 13, surface alterations 1374 are in a serrated manner extending radially from a midpoint on the top surface over the cutting edge 1370 onto the side surface.

Figure 14:
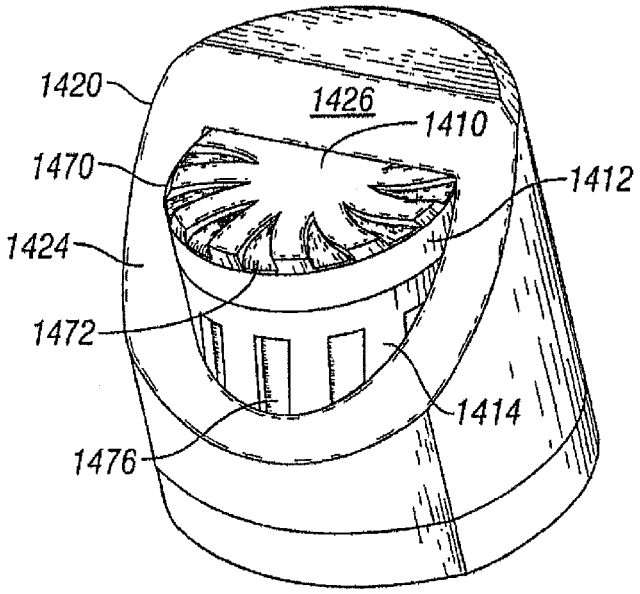
FIG. 14 shows a schematic of a cutting element according to one embodiment disclosed herein.

Referring to FIG. 14, a cutting element having a non-planar cutting face and substrate is shown. As shown in this embodiment, cutting element 1400 includes an inner rotatable (dynamic) cutting element 1410 which is partially disposed in, and thus, partially surrounded by an outer support (static) element 1420. Outer support element 1420 includes a bottom portion (not shown), a side portion 1424, and top portion 1426. Inner rotatable cutting element 1410 includes a cutting face 1412 portion disposed on an upper surface of substrate 1414. Inner rotatable cutting element is disposed within the cavity defined by the bottom portion (not shown), side portion 1424, and top portion 1426. Cutting face 1412 includes surface alterations 1472 on its top surface. As shown in FIG. 14, surface alterations 1472 are in a serrated manner extending radially from a midpoint on the top surface to the cutting edge 1470. Additionally, the side surface of substrate 1414 includes surface alterations 1476.

Figure 15:
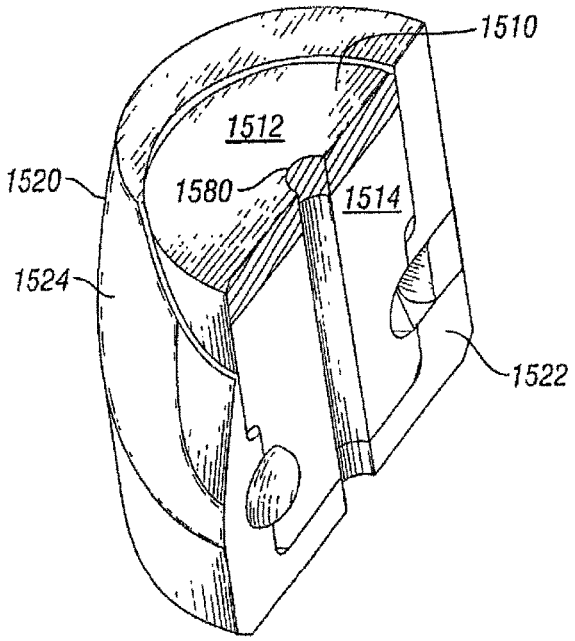
FIG. 15 shows a schematic of a cutting element according to one embodiment disclosed herein.

Referring to FIG. 15, a cutting element having a non-planar surface thereon is shown. As shown in this embodiment, cutting element 1500 includes an inner rotatable (dynamic) cutting element 1510 which is partially disposed in, and thus, partially surrounded by an outer support (static) element 1520. Outer support element 1520 includes a bottom portion 1522 and a side portion 1524. Inner rotatable cutting element 1510 includes a cutting face 1512 portion disposed on an upper surface of substrate 1514. Inner rotatable cutting element 1510 is disposed within the cavity defined by the bottom portion 1522 and side portion 1524. An internal bore 1580 extends through inner rotatable cutting element 1510 through the bottom portion 1522 of outer support element 1520. A passage (not shown) may connect internal bore 1580 to a fluid conduit on, for example, a drill bit surface, a blade, or a drill bit assembly.

Internal bore 1580 may be formed with surface alterations or geometrically shaped edges (e.g., rifling and/or twisting) (not shown) to direct the flow of fluid therethrough. Such fluid direction may give the inner rotatable cutting element 1510 a greater likelihood of continuous motion in one direction. In this embodiment, a fluid may be directed through passage (not shown) into internal bore 1580, therein generating a rolling force. The fluid may exit cutting element 1500 in a variety of ways, including through spacing (not shown) between inner rotatable cutting element 1510 and outer support element 1520 or through a second internal passage (not shown) and be directed back into the fluid conduit.

While the above embodiments describe surface alterations formed, for example, by etching or machining, it is also within the scope of the present disclosure that the cutting element includes a non-planar cutting face that may be achieved through protrusions from the face. Non-planar cutting faces may also be achieved through the use of shaped cutting faces in the inner rotatable cutting element. For example, shaped cutting faces suitable for use in the cutting elements of the present disclosure may include domed or rounded tops and saddle shapes.

Figure 16A:
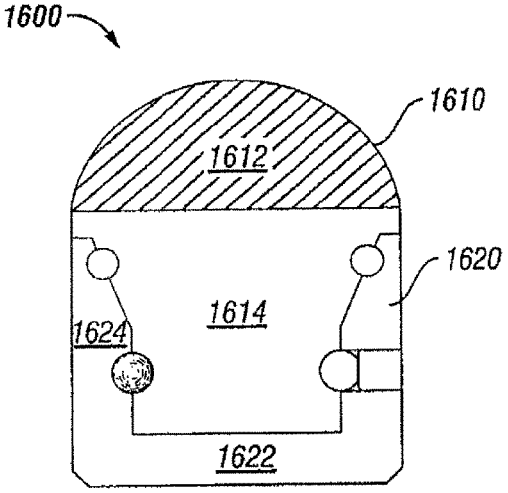
FIGS. 16A-B show a schematic of a cutting element according to one embodiment disclosed herein.
Figure 16B:
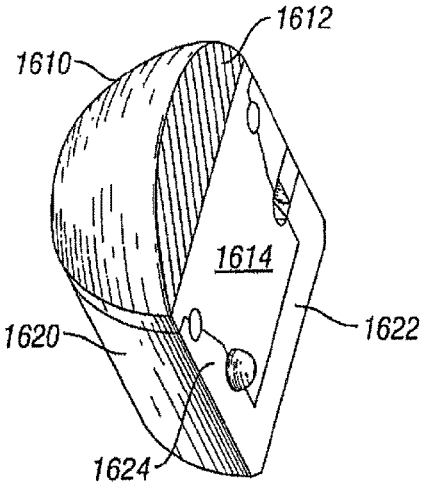

Referring to FIGS. 16A-B, a cutting element having a non-planar cutting face is shown. As shown in this embodiment, cutting element 1600 includes an inner rotatable (dynamic) cutting element 1610 which is partially disposed in, and thus, partially surrounded by an outer support (static) element 1620. Outer support element 1620 includes a bottom portion 1622 and a side portion 1624. Inner rotatable cutting element 1610 includes a cutting face 1612 portion disposed on an upper surface of substrate 1614. Inner rotatable cutting element is disposed within the cavity defined by the bottom portion 1622 and side portion 1624. As shown in FIGS. 16A-B, cutting face 1612 is dome shaped.

Further, the types of bearing surfaces between the inner rotatable cutting element and outer support elements present in a particular cutting element may vary. Among the types of bearing surfaces that may be present in the cutting elements of the present disclosure include conical bearing surfaces, radial bearing surfaces, and axial bearing surfaces.

In one embodiment, the inner rotatable cutting element may of a generally frusto-conical shape within an outer support element having a substantially mating shape, such that the inner rotatable cutting element and outer support element have conical bearing surfaces therebetween. Referring to FIGS. 2A-B, such an embodiment with conical bearing surfaces is shown. As shown in this embodiment, conical bearing surfaces 292 between the inner rotatable cutting element 210 and outer support element 220 may serve to take a large portion of the thrust from the rotating inner rotatable cutting element 210 during operation as it interacts with a formation. Further, in applications needing a more robust cutting element, a conical bearing surface may provide a larger area for the applied load. The embodiment shown in FIG. 2A-B also shows a radial bearing surface 294 and an axial bearing surface 296.

Referring to FIGS. 12A-B, a cutting element according to another embodiment is shown. As shown in this embodiment, the inner rotatable cutting element 1210 has a generally cylindrical shape with the side portion 1224 of outer support element having a generally annular or mating shape, such that the inner rotatable cutting element 1210 and outer support element 1220 having a radial bearing surface 1294 therebetween.

Figure 17A:
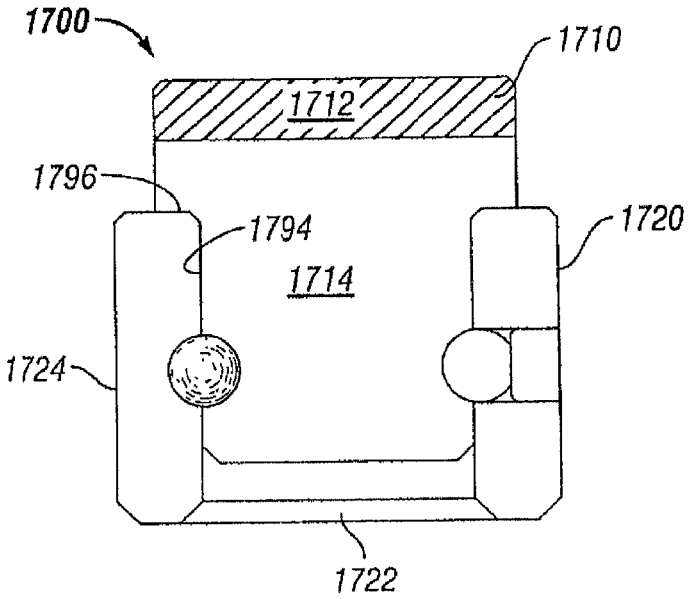
FIGS. 17A-B show a schematic of a cutting element according to one embodiment disclosed herein.
Figure 17B:
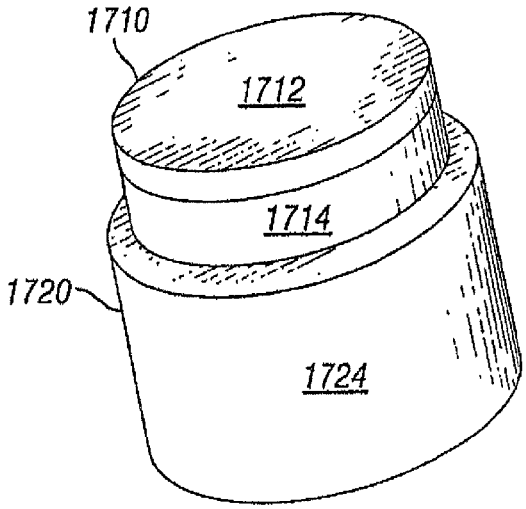

Referring to FIGS. 17A-B, a cutting element according to another embodiment is shown. As shown in this embodiment, cutting element 1700 includes an inner rotatable (dynamic) cutting element 1710 which is partially disposed in, and thus, partially surrounded by an outer support (static) element 1720. Outer support element 1720 includes a bottom portion 1722 and a side portion 1724. Inner rotatable cutting element 1710 includes a cutting face 1712 portion disposed on an upper surface of substrate 1714. At the upper surface of side portion 1724 of outer support element 1720, a portion of inner rotatable cutting element 1710 is juxtaposed thereto, creating an axial bearing surface 1796 therebetween. Cutting element 1700 also has a radial bearing surface 1794 between inner rotatable cutting element 1710 and side portion 1724 of outer support element 1720.

In one further embodiment, a distance between an upper surface of the cutting face and a bearing surface may be varied to reduce or prevent fracture of the inner rotatable cutting elements due to excessive bending stresses encountered during drilling. In the embodiment shown in FIG. 2, the distance between the upper surface of the cutting face 212 and the axial bearing surface 296 and/or conical bearing surface 292 is equivalent to the exposed portion 216. However, in the embodiment shown in FIG. 12, because the side portion 1224 (and hence the radial bearing surface 1294) extends to the upper surface of cutting face 1212, the distance between the upper surface of cutting face 1212 and radial bearing surface 1924 is zero. In various embodiments, the shape of the cutting element components may be designed such that the distance between the upper surface of the cutting face and a bearing surface may range from 0 to about 0.300 inches.

Figure 18:
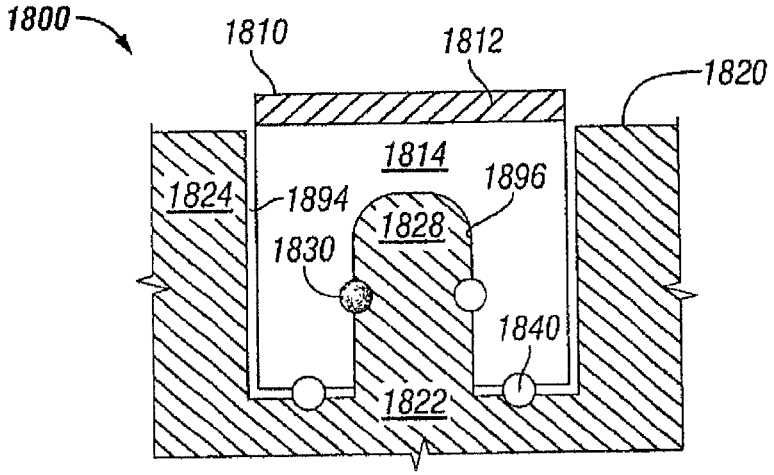
FIG. 18 show a schematic of a cutting element according to one embodiment disclosed herein.

Referring to FIG. 18, a cutting element according to another embodiment is shown. As shown in this embodiment, cutting element 1800 includes an inner rotatable (dynamic) cutting element 1810 which is partially disposed in, and thus, partially surrounded by an outer support (static element) 1820. Outer support element 1820 includes a bottom portion 1822 and a side portion 1824. Inner rotatable cutting element 1810 includes a cutting face 1812 portion disposed on an upper surface of substrate 1814. As shown in this embodiment, outer support element 1820 is integral with a bit body (not shown). In alternative embodiments, outer support element 1820 may be a discrete element or outer support element 1820 may include for example, a discrete side portion 1824 and a bottom portion integral with the bit. As also shown in this embodiment, outer support element 1820 also includes a inner shaft portion 1828 extending from bottom portion 1822 into substrate 1814 of inner rotatable cutting element 1810 such that when inner rotatable cutting element 1810 rotates, it rotates within side portion 1824 and about inner shaft portion 1828 of outer support element 1820. Retention balls (i.e., ball bearings) 1830 are disposed in grooves 1813, 1823 in the inner rotatable cutting element 1810 and outer support element 1820, respectively, and assist in retaining inner rotatable cutting element 1810 within outer support element 1820. A seal 1840 is disposed between a lower surface of substrate 1814 and bottom portion 1822. As shown in the illustrated embodiment, the cutting element includes an outer cylindrical bearing surface 1894 between side portion 1824 and substrate 1814 and an inner cylindrical bearing surface 1898 between inner shaft portion 1828 and substrate 1814.

Figure 19:
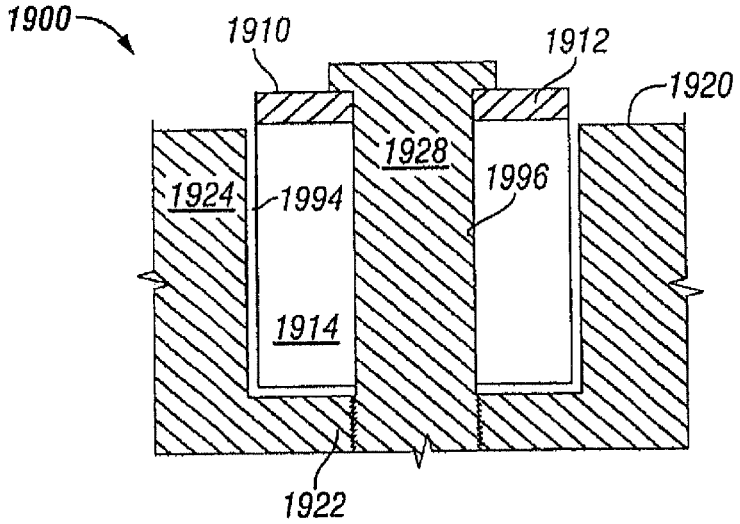
FIG. 19 shows a schematic of a cutting element according to one embodiment disclosed herein.

Referring to FIG. 19, a cutting element according to another embodiment is shown. As shown in this embodiment, cutting element 1900 includes an inner rotatable (dynamic) cutting element 1910 which is partially disposed in, and thus, partially surrounded by an outer support (static element) 1920. Outer support element 1920 includes a bottom portion 1922 and a side portion 1924. Inner rotatable cutting element 1910 includes a cutting face 1912 portion disposed on an upper surface of substrate 1914. As shown in this embodiment, outer support element 1920 is integral with a bit body (not shown). In alternative embodiments, outer support element 1920 may be a discrete element. As also shown in this embodiment, outer support element 1920 also includes a inner shaft portion 1928 threadedly attached to and extending from bottom portion 1922 into substrate 1914 of inner rotatable cutting element 1910 such that when inner rotatable cutting element 1910 rotates, it rotates within side portion 1924 and about inner shaft portion 1928 of outer support element 1920. In alternative embodiments, inner shaft portion 1928 may be integral with bottom portion 1922. Upper end of inner shaft portion 1928 extends partially over the cutting face 1912 of the inner rotatable cutting element 1910 to assist in retaining the inner rotatable cutting element 1910 within the outer support element 1920.

As shown in the various illustrated above, the inner rotatable cutting element and outer support cutting element may take the form of a variety of shapes/geometries. Depending on the shapes of the components, different bearings surfaces, or combinations thereof may exist between the inner rotatable cutting element and outer support element. However, one of ordinary skill in the art would recognize that permutations in the shapes may exist and any particular geometric forms should not be considered a limitation on the scope of the cutting elements disclosed herein.

Further, one of ordinary skill in the art would also appreciate that any of the design modifications as described above, including, for example, side rake, back rake, variations in geometry, surface alteration/etching, seals, bearings, material compositions, etc, may be included in various combinations not limited to those described above in the cutting elements of the present disclosure.

The cutting elements of the present disclosure may be incorporated in various types of cutting tools, including for example, as cutters in fixed cutter bits or as inserts in roller cone bits. Bits having the cutting elements of the present disclosure may include a single rotatable cutting element with the remaining cutting elements being conventional cutting elements, all cutting elements being rotatable, or any combination therebetween of rotatable and conventional cutting elements.

In some embodiments, the placement of the cutting elements on the blade of a fixed cutter bit or cone of a roller cone bit may be selected such that the rotatable cutting elements are placed in areas experiencing the greatest wear. For example, in a particular embodiment, rotatable cutting elements may be placed on the shoulder or nose area of a fixed cutter bit. Additionally, one of ordinary skill in the art would recognize that there exists no limitation on the sizes of the cutting elements of the present disclosure. For example, in various embodiments, the cutting elements may be formed in sizes including, but not limited to, 9 mm, 13 mm, 16 mm, and 19 mm.

Figure 20:
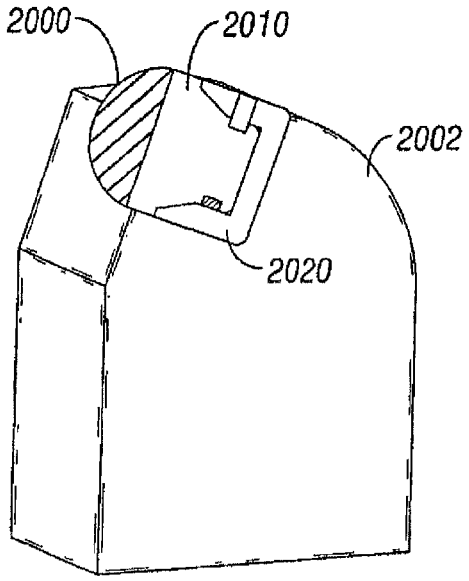
FIG. 20 shows a schematic of a cutting element on a blade according to one embodiment disclosed herein.

Referring now to FIG. 20, a cutting element 2000 disposed on a blade 2002, in accordance with an embodiment of the present disclosure, is shown. In this embodiment, cutting element 2000 includes an inner rotatable cutting element 2010 partially disposed in outer support element 2020. To vary the cutting action and potentially change the cutting efficiency and rotation, one of ordinary skill in the art should understand that the back rake (i.e., a vertical orientation) and the side rake (i.e., a lateral orientation) of the cutting element 2000 may be adjusted.

Figure 21:
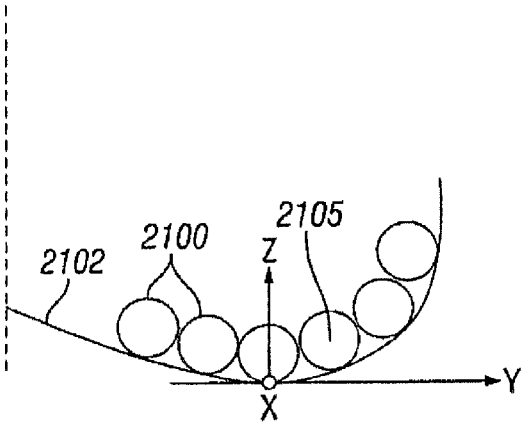
FIG. 21 shows a bit profile according to one embodiment disclosed herein.

Referring to FIG. 21, a cutting structure profile of a bit according to one embodiment is shown. As shown in this embodiment, cutters 2100 positioned on a blade 2102 may have side rake or back rake. Side rake is defined as the angle between the cutting face 2105 and the radial plane of the bit (x-z plane). When viewed along the z-axis, a negative side rake results from counterclockwise rotation of the cutter 2100, and a positive side rake, from clockwise rotation. Back rake is defined as the angle subtended between the cutting face 2105 of the cutter 2100 and a line parallel to the longitudinal axis 2107 of the bit. In one embodiment, a cutter may have a side rake ranging from 0 to ±45 degrees. In another embodiment, a cutter may have a back rake ranging from about 5 to 35 degrees.

A cutter may be positioned on a blade with a selected back rake to assist in removing drill cuttings and increasing rate of penetration. A cutter disposed on a drill bit with side rake may be forced forward in a radial and tangential direction when the bit rotates. In some embodiments because the radial direction may assist the movement of inner rotatable cutting element relative to outer support element, such rotation may allow greater drill cuttings removal and provide an improved rate of penetration. One of ordinary skill in the art will realize that any back rake and side rake combination may be used with the cutting elements of the present disclosure to enhance rotatability and/or improve drilling efficiency.

As a cutting element contacts formation, the rotating motion of the cutting element may be continuous or discontinuous. For example, when the cutting element is mounted with a determined side rake and/or back rake, the cutting force may be generally pointed in one direction. Providing a directional cutting force may allow the cutting element to have a continuous rotating motion, further enhancing drilling efficiency.

In alternate embodiments, cutting elements may be disposed in drill bits that do not incorporate back rake and/or side rake. When the cutting element is disposed on a drill bit with substantially zero degrees of side rake and/or back rake, the cutting force may be random instead of pointing in one general direction. The random forces may cause the cutting element to have a discontinuous rotating motion. Generally, such a discontinuous motion may not provide the most efficient drilling condition, however, in certain embodiments, it may be beneficial to allow substantially the entire cutting surface of the insert to contact the formation in a relatively even manner. In such an embodiment, alternative inner rotatable cutting element and/or cutting surface designs may be used to further exploit the benefits of rotatable cutting elements.

Figure 22:
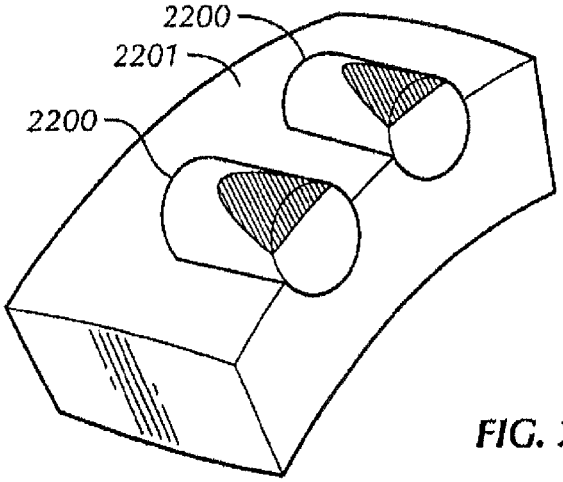
FIG. 22 shows a cutting element assembly according to one embodiment disclosed herein.

The cutting elements of the present disclosure may be attached to or mounted on a drill bit by a variety of mechanisms, including but not limited to conventional attachment or brazing techniques in a cutter pocket. One alternative mounting technique that may be suitable for the cutting elements of the present disclosure is shown in FIG. 22. As shown in this embodiment, cutting elements 2200 are mounted in an assembly 2201, which may be mounted on a bit body (not shown) by means such as mechanical, brazing, or combinations thereof It is also within the scope of the present disclosure that in some embodiments, an inner rotatable cutting element may be mounted on the bit directly such that the bit body acts as the outer support element, i.e., by inserting the inner rotatable cutting element into a hole that may be subsequently blocked to retain the inner rotatable cutting element within.

Advantageously, embodiments disclosed herein may provide for at least one of the following. Cutting elements that include a rotatable cutting portion may avoid the high temperatures generated by typical fixed cutters. Because the cutting surface of prior art cutting elements is constantly contacting formation, heat may build-up that may cause failure of the cutting element due to fracture. Embodiments in accordance with the present invention may avoid this heat build-up as the edge contacting the formation changes. The lower temperatures at the edge of the cutting elements may decrease fracture potential, thereby extending the functional life of the cutting element. By decreasing the thermal and mechanical load experienced by the cutting surface of the cutting element, cutting element life may be increase, thereby allowing more efficient drilling.

Further, rotation of a rotatable portion of the cutting element may allow a cutting surface to cut formation using the entire outer edge of the cutting surface, rather than the same section of the outer edge, as provided by the prior art. The entire edge of the cutting element may contact the formation, generating more uniform cutting element edge wear, thereby preventing for formation of a local wear flat area. Because the edge wear is more uniform, the cutting element may not wear as quickly, thereby having a longer downhole life, and thus increasing the overall efficiency of the drilling operation.

Additionally, because the edge of the cutting element contacting the formation changes as the rotatable cutting portion of the cutting element rotates, the cutting edge may remain sharp. The sharp cutting edge may increase the rate of penetration while drilling formation, thereby increasing the efficiency of the drilling operation. Further, as the rotatable portion of the cutting element rotates, a hydraulic force may be applied to the cutting surface to cool and clean the surface of the cutting element.

Some embodiments may protect the cutting surface of a cutting element from side impact forces, thereby preventing premature cutting element fracture and subsequent failure. Still other embodiments may use a diamond table cutting surface as a bearing surface to reduce friction and provide extended wear life. As wear life of the cutting element embodiments increase, the potential of cutting element failure decreases. As such, a longer effective cutting element life may provide a higher rate of penetration, and ultimately result in a more efficient drilling operation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A cutting element for a drill bit, comprising:
an outer support element; and
an inner rotatable cutting element, a portion of which is disposed in the outer support element, the inner rotatable cutting element comprising:
a body having a non-planar cutting face;
wherein the body comprises [an] *a single* ultra hard material body disposed on *an interface surface of* a substrate, the ultra hard material body forming the non-planar cutting face; and
wherein a radial bearing is formed between a portion of the ultra hard material body and the outer support element.

2. The cutting element of claim 1, wherein the ultra hard material body comprises diamond.

3. The cutting element of claim 1, wherein the outer support element covers a portion of the non-planar cutting face.

4. A cutting element for a drill bit, comprising:
an outer support element;
an inner rotatable cutting element, a portion of which is disposed in the outer support element, the inner rotatable cutting element comprising:
a non-planar cutting face;
a body comprising a shaft portion, the shaft portion having a diameter less than the diameter of the non-planar cutting face; and
an axial bearing formed between a portion of the outer support element and the inner rotatable cutting element.

5. The cutting element of claim 4, wherein the non-planar cutting face comprises a plurality of surface alterations formed thereon.

6. The cutting structure of claim 5, wherein the surface alterations have a depth ranging from 0.001 to 0.05 inches.

7. The cutting element of claim 4, wherein the non-planar cutting face is dome shaped, the dome shape extending across the diameter of the non-planar cutting face.

8. The cutting element of claim 4, wherein the non-planar cutting face has a convex shape.

9. The cutting element of claim 4, wherein the cutting element further comprises at least one retention mechanism disposed between the inner rotatable cutting element and the outer support element.

10. A drill bit, comprising:

a bit body having a plurality of blades extending radially from the bit body and axially along a length of the bit body; and at least one cutting element of claim 4 mounted to at least one of the plurality of blades.

11. The cutting element of claim 4, wherein the non-planar cutting face is saddle shaped.

12. A cutting structure for a cutting tool, comprising:

an outer support element having a bottom portion and a side portion; and an inner rotatable cutting element, a portion of which is disposed in the outer support element;

wherein the outer support element further comprises an inner shaft portion extending from the bottom portion into the inner rotatable cutting element.

13. The cutting structure of claim 12, wherein the inner shaft portion is threadedly attached to the bottom portion.

14. The cutting structure of claim 12, wherein the inner shaft portion is integral with the bottom portion.

15. The cutting structure of claim 12, wherein an upper end of the inner shaft portion extends partially over a cutting face of the inner rotatable cutting element.

16. The cutting structure of claim 12, wherein at least a portion of a bearing surface of the outer support element comprises a lubricious material.

17. The cutting structure of claim 12, wherein the outer support element is integral with a cutting tool body.

18. The cutting structure of claim 12, wherein at least a side portion of the outer support element is a blade of a cutting tool.

19. The cutting structure of claim 12, wherein the outer support element is a discrete element.

20. A drill bit, comprising:

a bit body having a plurality of blades extending radially therefrom; and at least one cutting element of claim 12 mounted to at least one of the plurality of blades.

*21. A structure of a cutting tool, comprising:*

*an outer support element; and*

*an inner rotatable element at least partially within the outer support element, the inner rotatable element including opposing ends that each comprise an ultra hard material portion.*

*22. The structure of claim 21, the inner rotatable element further including at least one substrate portion between the ultra hard material portions of the opposing ends of the inner rotatable element.*

*23. The structure of claim 21, wherein the inner rotatable element includes a side surface extending between the ultra hard material portions of the opposing ends, and wherein at least a portion of the side surface of the inner rotatable element includes an ultra hard material.*

*24. The structure of claim 23, wherein the ultra hard material of the side surface is distinct from the ultra hard material portions of the opposing ends of the inner rotatable element.*

*25. The structure of claim 23, wherein the ultra hard material of the side surface is on a circumferential bearing surface.*

*26. The structure of claim 23, wherein the ultra hard material of the side surface forms a continuous circumferential bearing surface around the inner rotatable element.*

*27. The structure of claim 23, wherein the ultra hard material of the side surface includes discrete ultra hard segments positioned a circumference of the inner rotatable element.*

*28. The structure of claim 23, wherein the ultra hard material of the side surface is in an ultra hard material layer extending a full diameter of the inner rotatable element.*

*29. The structure of claim 21, wherein the outer support element is integral with and defined by a cutting tool.*

*30. The structure of claim 21, wherein the outer support element comprises at least a first portion that covers a portion of a side surface of the inner rotatable element and a second portion that covers at least a portion of a first end of the opposing ends of the inner rotatable element.*

*31. The structure of claim 21, wherein the outer support element covers at least a portion of each of the opposing ends of the inner rotatable element, and the outer support element extends a full length of the inner rotatable element and covers a full length of a portion of a side surface of the inner rotatable element.*

*32. The structure of claim 31, wherein a portion of the side surface and at least a portion of one of the opposing ends are exposed while the inner rotatable element is within the outer support element.*

*33. The structure of claim 21, wherein the inner rotatable element is a cylindrical body having a substantially constant diameter along its entire length.*

*34. A cutting tool, comprising:*

*a tool body, the tool body including at least one radially extending blade; and*

*at least one pocket formed in the at least one blade,*

*at least one rolling element retained in the at least one pocket such that the at least one rolling element is free to rotate about an axis of the at least one rolling element, the at least one rolling element including opposing end faces and ultra hard material at each of the opposing end faces.*

*35. The cutting tool of claim 34, wherein the at least one rolling element includes a side surface between ultra hard material portions at the opposing end faces, and wherein at least a portion of the side surface of the inner rotatable element comprises an ultra hard material on an outer circumference of the side surface.*

*36. The cutting tool of claim 34, wherein the ultra hard material of the side surface of the inner rotatable element is on a bearing surface and either forms an ultra hard material layer or is embedded within a substrate of the at least one rolling element.*

*37. The cutting tool of claim 34, wherein the at least one rolling element is a rotatable cutting element.*

*38. A structure of a cutting tool, comprising:*

*an outer support element; and*

*an inner rotatable element, a portion of which is disposed in the outer support element, wherein a first portion of the outer support element covers a portion of a first end surface of the inner rotatable element, wherein a second portion covers at least a portion of a second end surface of the inner rotatable element, and wherein a side portion of the outer support element extending between the first and second portions of the outer support element covers a portion of a side surface of the inner rotatable element extending between the first and second ends of the inner rotatable element.*

*39. The structure of claim 38, wherein the inner rotatable element comprises a plurality of distinct layers of diamond.*

*40. The structure of claim 39, wherein the plurality of distinct layers include distinct layers at each of the first and second end surfaces of the inner rotatable element.*

*41. The structure of claim 40, wherein the plurality of distinct layers include at least one intermediate layer*

*between the distinct layers at each of the first and second end surfaces of the inner rotatable element.*

*42. The structure of claim 38, wherein the outer support element includes a blade of a drill bit.*

*43. The structure of claim 38, wherein the outer support element includes at least one bearing surface opposite the inner rotatable element.*

*44. An element of a drill bit, comprising:*

*an outer support element; and*

*an inner rotatable element, a portion of which is encased by the outer support element, the inner rotatable element including first and second end surfaces and a side surface extending between the first and second end surfaces, at least the first end surface including a diamond face,*

*wherein the outer support element comprises a first portion that at least partially covers the diamond face and a second portion that partially covers the side surface of the inner rotatable element, wherein the first portion and the second portion of the outer support element are integral.*

*45. The element of claim 44, wherein the inner rotatable element is in a pocket in a blade of the drill bit, and wherein the outer support element is the blade.*

*46. The element of claim 44, wherein at least a portion of the side surface of the inner rotatable element is exposed.*

*47. The element of claim 44, wherein the outer support element further comprises a third portion that at least partially covers the second end surface of the inner rotatable element.*

*48. A drill bit, comprising:*

*a bit body having at least one radially extending blade;*

*at least one pocket formed in the at least one radially extending blade, and*

*at least one rolling element having a cylindrical body with a substantially constant diameter along its entire length retained in the at least one pocket, such that the at least one rolling element is free to rotate about an axis of the rolling element.*

*49. The drill bit of claim 48, wherein the at least one rolling element includes first and second ends of the cylindrical body and at least first and second diamond portions, wherein the first diamond portion is closer to the first end of the cylindrical body than to the second end of the cylindrical body, and wherein the second end of the cylindrical body is closer to the second diamond portion than to the first diamond portion.*

*50. The drill bit of claim 49, wherein the at least one rolling element includes a third diamond portion axially between the first and second diamond portions, and wherein the third diamond portion is at least partially on a circumferential side surface of the cylindrical body of the at least one rolling element.*

*51. The drill bit of claim 50, wherein the third diamond portion forms a continuous bearing surface around the circumferential side surface of the cylindrical body.*

*52. The drill bit of claim 48, wherein the cylindrical body includes opposing ends and the at least one rolling element comprises diamond at each of the opposing ends of the cylindrical body.*

*53. The drill bit of claim 48, wherein the at least one radially extending blade defines is integral with, and defines, an outer support element partially enclosing the at least one rolling element.*

*54. The drill bit of claim 48, wherein the at least one rolling element is a rolling cutting element.*

* * * * *